(12) United States Patent
Kim et al.

(10) Patent No.: US 12,225,477 B2
(45) Date of Patent: Feb. 11, 2025

(54) METHOD BY WHICH TERMINAL PERFORMS SIDELINK COMMUNICATION IN WIRELESS COMMUNICATION SYSTEM FOR SUPPORTING SIDELINK, AND APPARATUS THEREFOR

(71) Applicant: LG Electronics Inc., Seoul (KR)

(72) Inventors: Heejin Kim, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 17/631,316

(22) PCT Filed: Aug. 24, 2020

(86) PCT No.: PCT/KR2020/011257
§ 371 (c)(1),
(2) Date: Jan. 28, 2022

(87) PCT Pub. No.: WO2021/034165
PCT Pub. Date: Feb. 25, 2021

(65) Prior Publication Data
US 2022/0264476 A1    Aug. 18, 2022

Related U.S. Application Data

(60) Provisional application No. 62/945,902, filed on Dec. 10, 2019, provisional application No. 62/946,391, filed on Dec. 10, 2019.

(30) Foreign Application Priority Data

Aug. 22, 2019    (KR) .................. 10-2019-0103345

(51) Int. Cl.
*H04W 48/16*    (2009.01)
*H04W 52/24*    (2009.01)
(Continued)

(52) U.S. Cl.
CPC ....... *H04W 52/245* (2013.01); *H04W 52/383* (2013.01); *H04W 76/14* (2018.02)

(58) Field of Classification Search
CPC .... H04B 17/328; H04W 8/005; H04W 48/16; H04W 92/18; H04W 52/245;
(Continued)

(56) References Cited

U.S. PATENT DOCUMENTS

| 11,071,000 B2* | 7/2021 | Si ........................ H04L 5/0053 |
| 2016/0302250 A1* | 10/2016 | Sheng .................. H04W 76/14 |

(Continued)

FOREIGN PATENT DOCUMENTS

WO    WO2016182293    11/2016

OTHER PUBLICATIONS

Fraunhofer HHI & Fraunhofer IIS, "Resource Allocation for Mode 2 NR V2X," R2-1907080, Presented at 3GPP TSG-RAN WG2 Meeting #106, Reno, USA, May 13-17, 2019, 8 pages.
(Continued)

*Primary Examiner* — Cindy Trandai
(74) *Attorney, Agent, or Firm* — Fish & Richardson P.C.

(57) ABSTRACT

According to various embodiments, disclosed are a method by which a terminal performs sidelink communication in a wireless communication system for supporting a sidelink, and an apparatus therefor. Disclosed are a method by which a first terminal performs sidelink communication in a wireless communication system for supporting a sidelink, and an apparatus therefor, the method comprising the steps of: transmitting a discovery signal in a discovery resource region; receiving a discovery response signal; and performing sidelink communication with a second terminal, wherein the transmission power related to the sidelink communica- (Continued)

tion is determined on the basis of a reference signal received power (RSRP) value measured in the discovery resource region.

6 Claims, 22 Drawing Sheets

(51) Int. Cl.
*H04W 52/38* (2009.01)
*H04W 76/14* (2018.01)

(58) Field of Classification Search
CPC ..... H04W 52/383; H04W 76/14; H04W 8/00; H04W 72/02; H04W 72/04
See application file for complete search history.

(56) References Cited

U.S. PATENT DOCUMENTS

| | | | | |
|---|---|---|---|---|
| 2017/0359766 | A1* | 12/2017 | Agiwal | H04L 5/0048 |
| 2018/0048436 | A1* | 2/2018 | Park | H04W 52/146 |
| 2018/0139082 | A1* | 5/2018 | Chen | H04L 5/0007 |
| 2018/0213382 | A1* | 7/2018 | Tabet | H04W 8/005 |
| 2018/0279275 | A1* | 9/2018 | Chen | H04W 72/23 |
| 2018/0332541 | A1* | 11/2018 | Liu | H04W 52/146 |
| 2019/0053305 | A1* | 2/2019 | Saiwai | H04L 5/0053 |
| 2019/0174440 | A1* | 6/2019 | Kwak | H04W 56/001 |
| 2020/0037329 | A1* | 1/2020 | Fu | H04L 5/0094 |
| 2020/0068537 | A1* | 2/2020 | Oh | H04W 72/23 |
| 2020/0213977 | A1* | 7/2020 | Xu | H04W 4/70 |
| 2020/0412430 | A1* | 12/2020 | Song | H04L 5/0051 |
| 2021/0105729 | A1* | 4/2021 | Park | H03F 3/245 |
| 2022/0015067 | A1* | 1/2022 | Li | H04L 5/0055 |
| 2022/0264478 | A1* | 8/2022 | Miao | H04W 52/242 |

OTHER PUBLICATIONS

International Search Report in International Appln. No. PCT/KR2020/011257, dated Dec. 15, 2020, 9 pages (with English translation).
MediaTek Inc., "Discussion on V2X Physical layer procedure," R1-1906558, Presented at 3GPP TSG RAN WG1 #97, Reno, USA, May 13-17, 2019, 10 pages.
SA2, "LS response on unicast, groupcast and broadcast in NR sidelink," R1-1905944, Presented at 3GPP TSG RAN WG1 #97, Reno, USA, May 13-17, 2019, 3 pages.
ZTE & Sanechips, "Overall consideration on NR V2X resource allocation," R2-1816981, Presented at 3GPP TSG-RAN WG2#104, Spokane, USA, Nov. 12-16, 2018, 7 pages.

* cited by examiner (a)

(b)

(a)

(b)

METHOD BY WHICH TERMINAL PERFORMS SIDELINK COMMUNICATION IN WIRELESS COMMUNICATION SYSTEM FOR SUPPORTING SIDELINK, AND APPARATUS THEREFOR

CROSS-REFERENCE TO RELATED APPLICATIONS

This application is a National Stage application under 35 U.S.C. § 371 of International Application No. PCT/KR2020/011257, filed on Aug. 24, 2020, which claims the benefit of U.S. Provisional Application No. 62/946,391, filed on Dec. 10, 2019, U.S. Provisional Application No. 62/945,902, filed on Dec. 10, 2019, and Korean Application No. 10-2019-0103345, filed on Aug. 22, 2019. The disclosures of the prior applications are incorporated by reference in their entirety.

TECHNICAL FIELD

The present disclosure relates to a method of performing sidelink communication by a user equipment (UE) and an apparatus therefor in a wireless communication system supporting sidelink, and more particularly, to a method of controlling transmission power for sidelink communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V21), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and apparatus for minimizing the problem of inaccurately determining initial transmission power due to lack of input measurement values by determining transmission power for sidelink communication based on the received strength of a discovery resource region, and a cyclic prefix (CP) type and/or a subcarrier spacing (SCS) in a resource region related to the sidelink communication, and appropriately determining transmission power for the sidelink communication.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

According to an aspect, a method of performing sidelink communication by a first user equipment (UE) in a wireless communication system supporting sidelink may include transmitting a discovery signal in a discovery resource region, receiving a discovery response signal, and performing sidelink communication with a second UE. Transmission power related to the sidelink communication may be determined based on a reference signal received power (RSRP) value measured in the discovery resource region.

Alternatively, at least one of RSRP values measured in the discovery resource region may be used as an input value to a layer 3-RSRP (L3-RSRP) filter related to power control of the sidelink communication.

Alternatively, the reception strength of the discovery response signal may be an RSRP.

Alternatively, an average value of RSRP values measured in the discovery resource region may be used as an input value to an L3-RSRP filter related to power control of the sidelink communication.

Alternatively, the first UE may perform the sidelink communication in a first resource region selected from among a plurality of resource regions linked to the discovery resource region based on at least one of a distance to the second UE or a minimum communication range requirement.

Alternatively, at least one of nominal power or a scaling factor which are related to the transmission power may be the at least one of the nominal power or the scaling factor is preconfigured to be different according to a CP length related to the CP type and the SCS.

Alternatively, the at least one of the nominal power or the scaling factor may be preconfigured to be different according to a CP length related to the CP type and the SCS.

Alternatively, the at least one of the nominal power and the scaling factor may be preconfigured in proportion to a CP length related to the CP type and the SCS.

Alternatively, the first UE may provide information about the CP type and the SCS configured for the first resource region to the second UE based on an n-bit indicator or information about the first resource region.

According to another aspect, a method of performing sidelink communication by a second UE in a wireless communication system supporting sidelink may include receiving a discovery signal in a discovery resource region, transmitting a discovery response signal, and performing sidelink communication with a first UE. Transmission power related to the sidelink communication may be determined based on a reference signal received power (RSRP) value measured in the discovery resource region.

Alternatively, at least one of RSRP values measured in the discovery resource region may be used as an input value to an L3-RSRP filter related to power control of the sidelink communication.

Alternatively, an average value of RSRP values measured in the discovery resource region may be used as an input value to an L3-RSRP filter related to power control of the sidelink communication.

According to another aspect, a first UE for performing sidelink communication in a wireless communication system supporting sidelink may include an RF transceiver and a processor coupled to the RF transceiver. The processor may be configured to transmit a discovery signal in a discovery resource region, receive a discovery response signal, and perform sidelink communication with a second UE by controlling the RF transceiver. Transmission power related to the sidelink communication may be determined based on a reference signal received power (RSRP) value measured in the discovery resource region.

According to another aspect, a second UE for performing sidelink communication in a wireless communication system supporting sidelink may include an RF transceiver and a processor coupled to the RF transceiver. The processor may be configured to receive a discovery signal in a discovery resource region, transmit a discovery response signal, and perform sidelink communication with a first UE by controlling the RF transceiver. Transmission power related to the sidelink communication may be determined based on an RSRP value measured in the discovery resource region.

According another aspect, a chipset for performing sidelink communication in a wireless communication system supporting sidelink may include at least one processor, and at least one memory operably coupled to the at least one processor and when executed, causing the at least one processor to perform operations. The operations may include receiving a discovery signal in a discovery resource region, transmitting a discovery response signal, and performing sidelink communication with a first UE. Transmission power related to the sidelink communication may be determined based on an RSRP value measured in the discovery resource region.

Alternatively, the processor may be configured to control a traveling mode of a device coupled to the chipset based on the transmission power related to the sidelink communication.

According to another aspect, a computer-readable storage medium including at least one computer program for the operation of sidelink communication of at least one processor in a wireless communication system supporting sidelink may include the at least one computer program for operation of sidelink communication of at least one processor, and the computer-readable storage medium storing the at least one computer program. The operations may include receiving a discovery signal in a discovery resource region, transmitting a discovery response signal, and performing sidelink communication with a first UE. Transmission power related to the sidelink communication may be determined based on an RSRP value measured in the discovery resource region.

According to another aspect, a method of performing sidelink communication by a first UE in a wireless communication system supporting sidelink may include being configured with a plurality of resource regions for sidelink communication, selecting a resource region configured with a CP type and an SCS which satisfy at least one of a distance to a second UE or a minimum communication range requirement for a packet from among the plurality of resource regions, and performing sidelink communication with the second UE in the selected resource region.

Alternatively, when a plurality of resources are selected, the first UE may select a first resource region configured with a CP type and an SCS which correspond to a smallest CP length among the plurality of resource regions.

Alternatively, it may be determined whether the first UE is allowed to select a second resource region configured with a CP type and an SCS which correspond to a larger CP length than the first resource region, based on at least one of mobility information about the first UE, a road state, or mobility information about the second UE.

Alternatively, at least one of nominal power or a scaling factor which are related to transmission power of the sidelink communication is determined based on at least one of a CP type or an SCS configured for the selected resource region.

Advantageous Effects

Various embodiments may minimize the problem of inaccurately determining initial transmission power due to lack of input measurement values by determining transmission power for sidelink communication based on the received strength of a discovery resource region, and a cyclic prefix (CP) type and/or a subcarrier spacing (SCS) in a resource region related to the sidelink communication, and appropriately determine transmission power for the sidelink communication.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
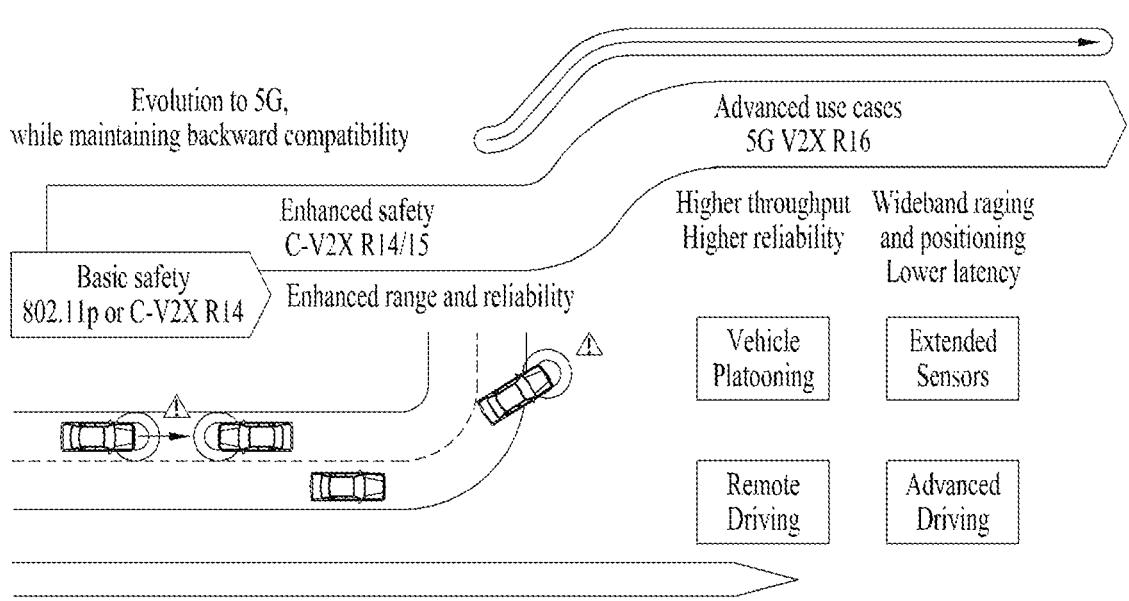
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
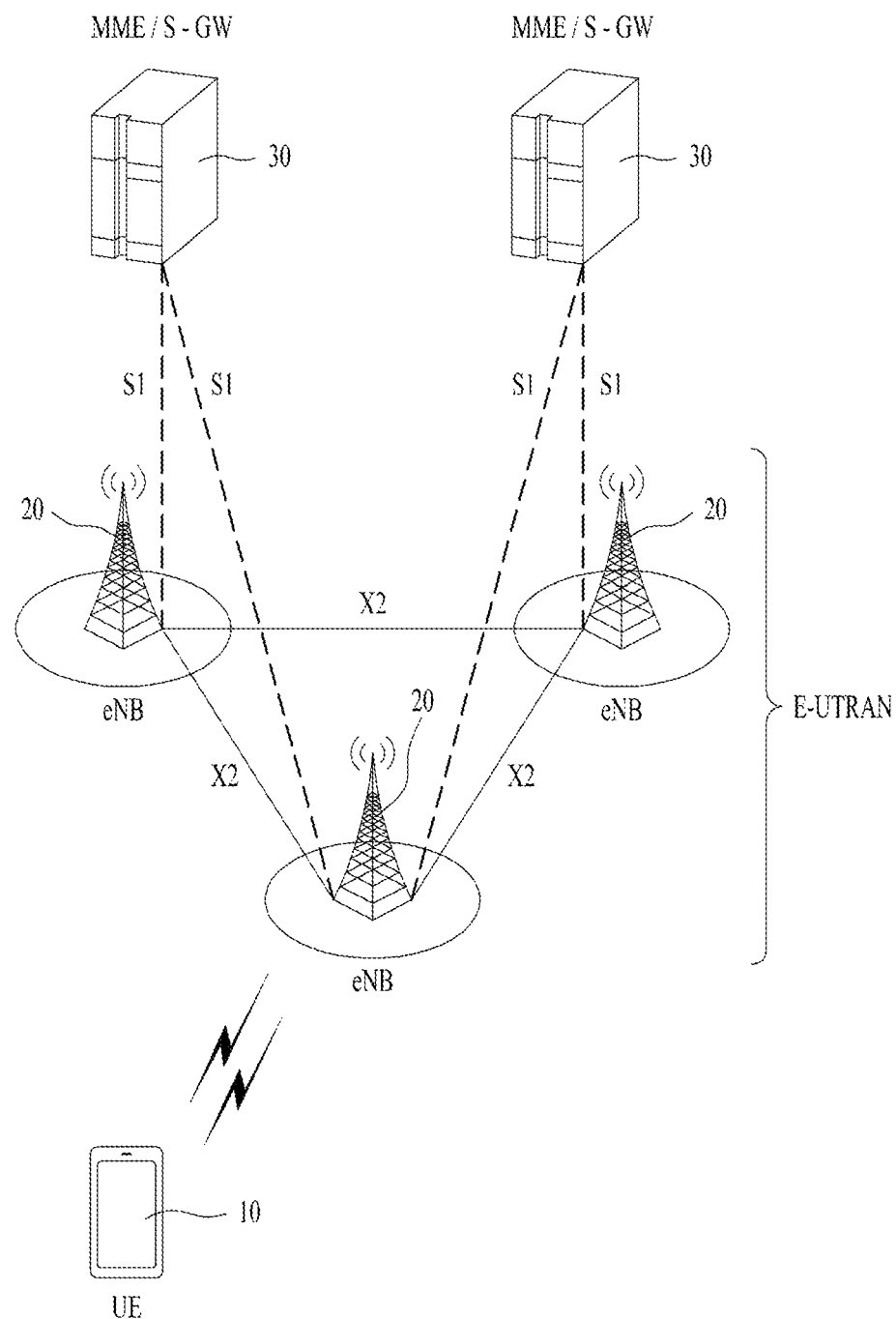
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW).

The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
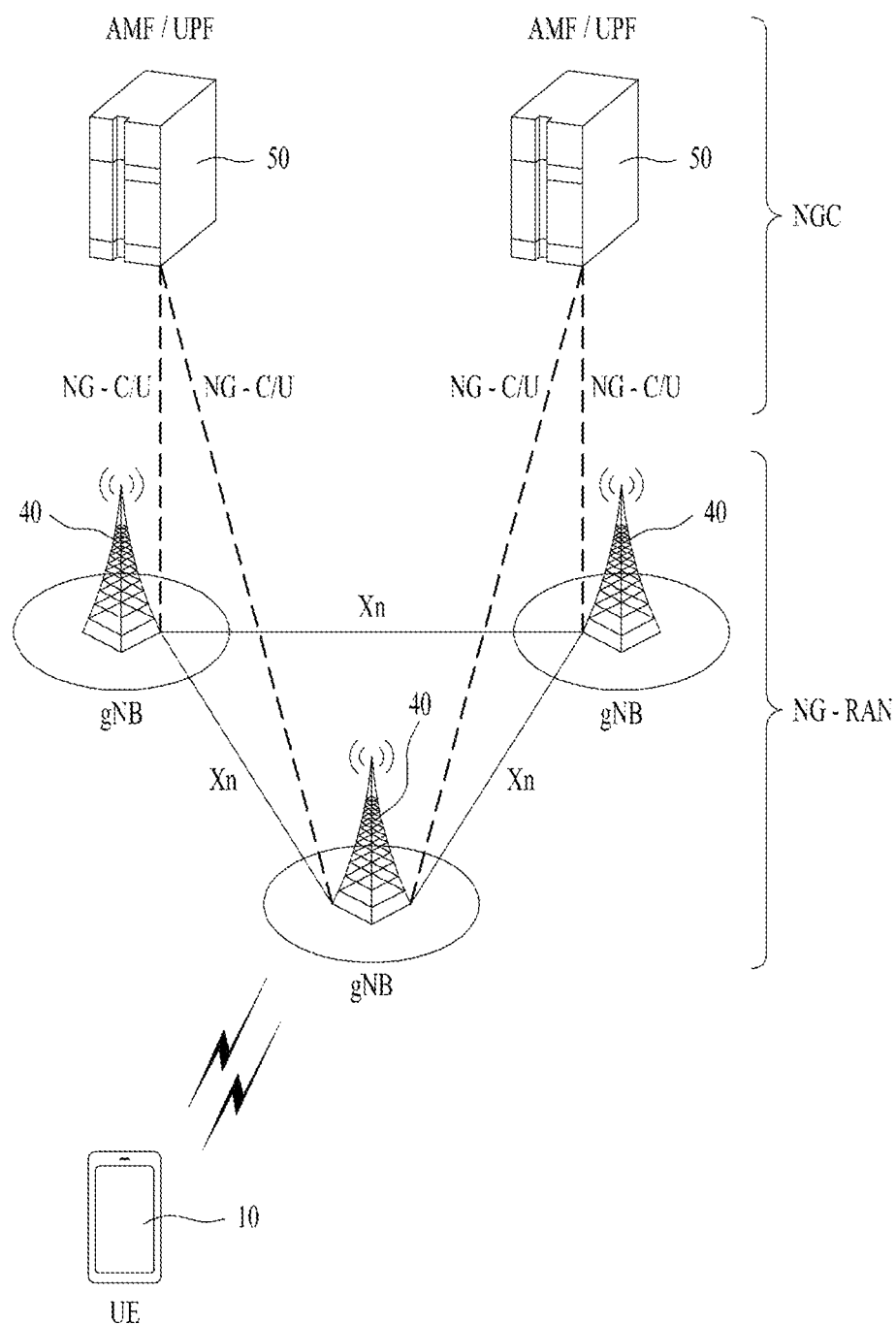
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
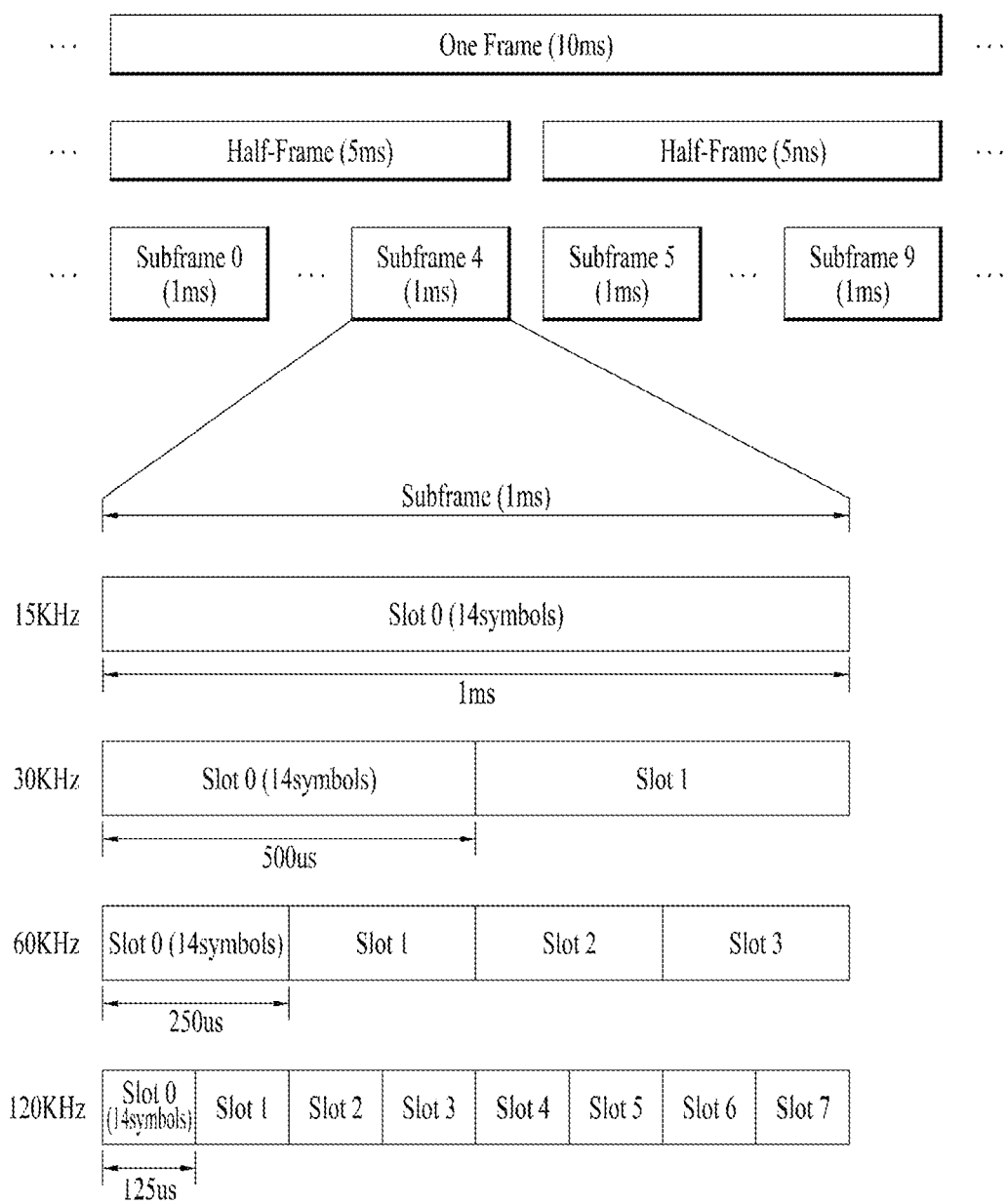
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, hd and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
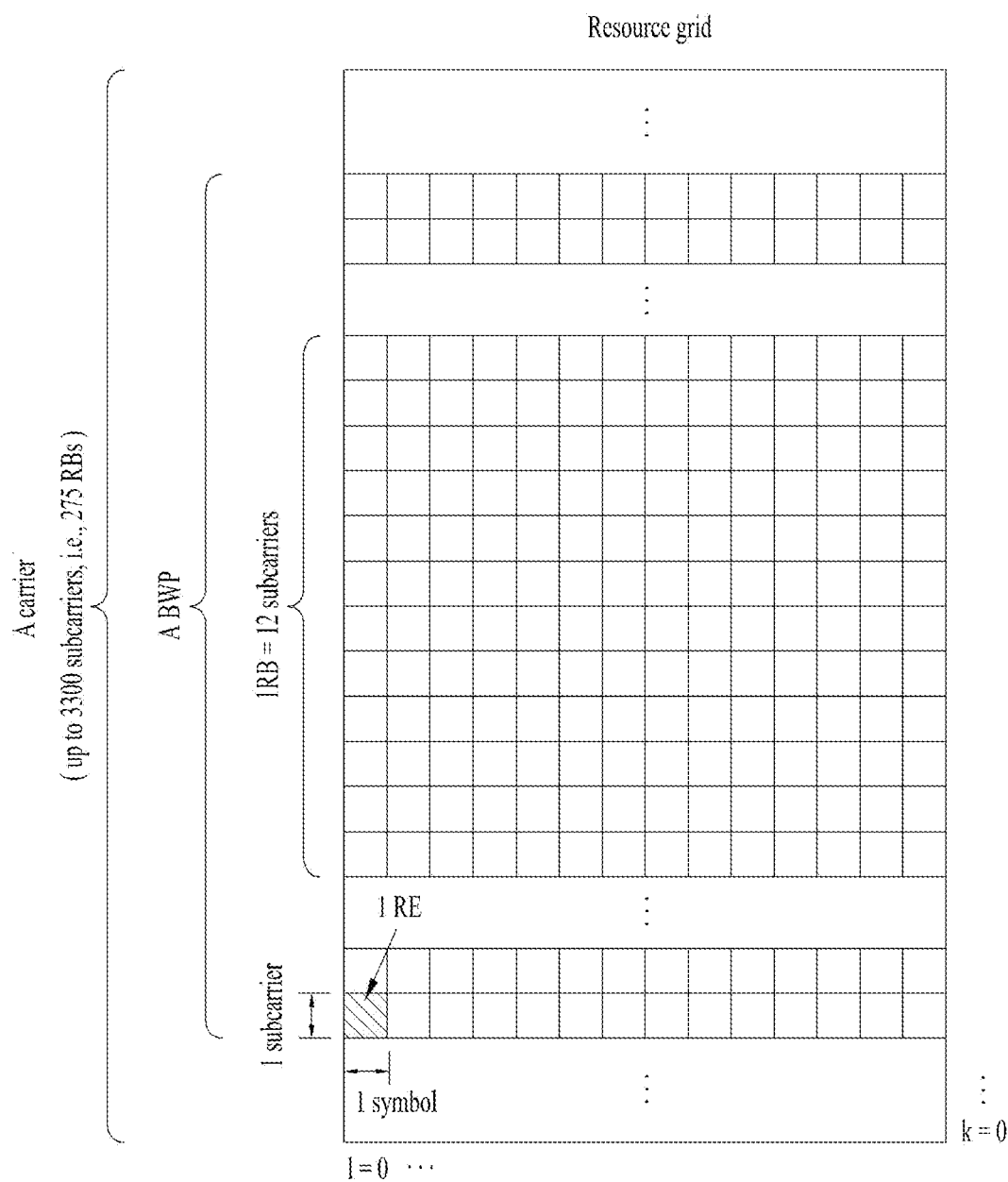
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
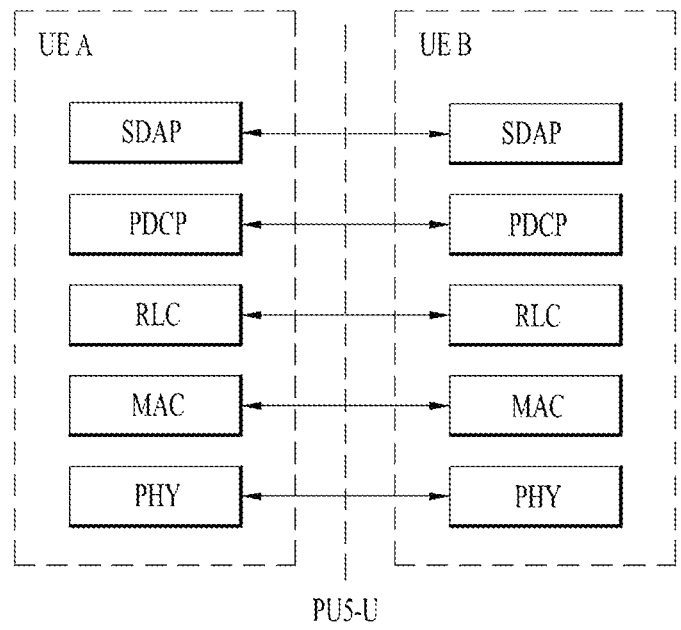
FIG. 6 illustrates a radio protocol architecture for SL communication.
Figure 6:
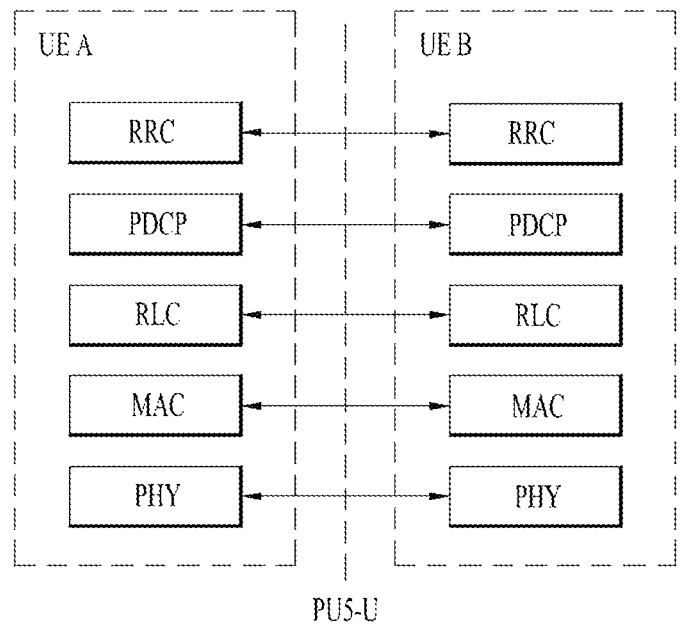

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type.

For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
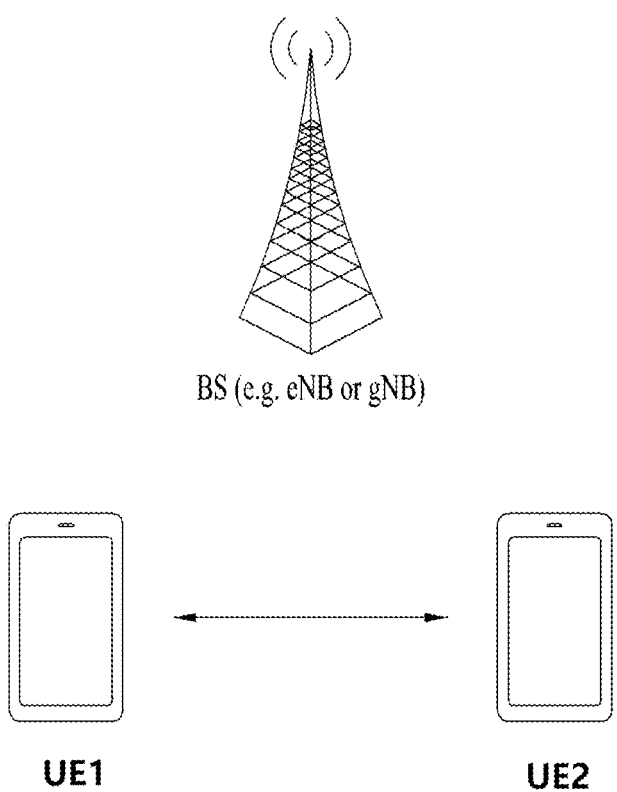
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
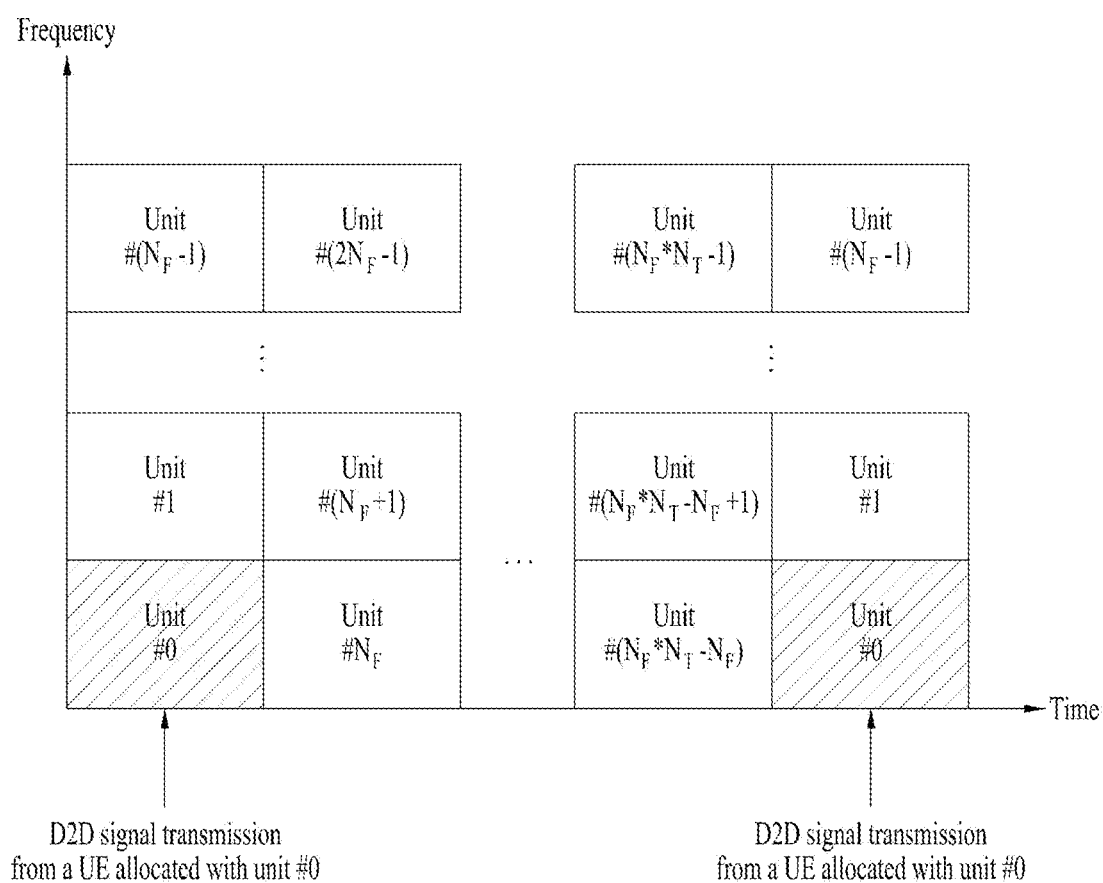
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
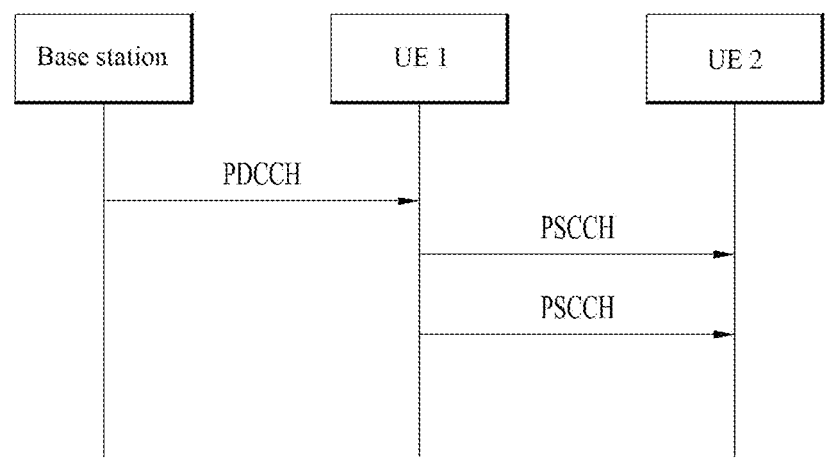
FIG. 9 illustrates a procedure in which UEs perform V2X or SL communication according to a transmission mode.
Figure 9:
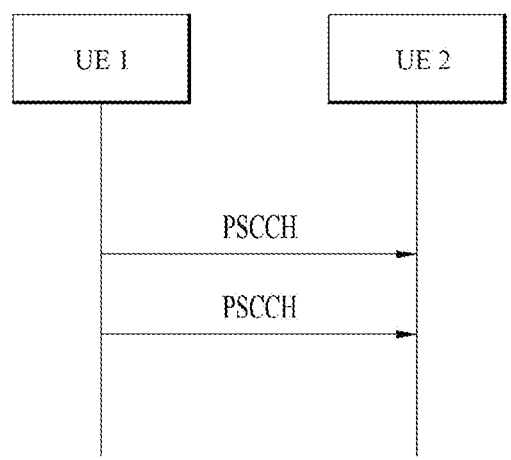

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Power Control in Consideration of Operation of a Plurality of BWPs

In legacy SL transmission, a plurality of UEs are synchronized with a common synchronization reference and transmit signals in different frequency resources. The synchronization reference may be a satellite signal such as a GNSS signal or a synchronization signal transmitted by a BS. Alternatively, the synchronization reference may be a sidelink synchronization signal (SLSS) transmitted on an SL by another UE. In this situation, it is ideal that each UE starts transmission according to a symbol boundary derived from the common reference, and a receiving UE also aligns a receiver window with the symbol boundary and performs FFT to extract a UE transmission signal in each frequency resource.

In real implementation, however, a signal transmitted from each transmitting UE may arrive at the receiving UE, experiencing a propagation delay. Therefore, the receiving UE receives the signal from the transmitting UE at a timing other than the symbol boundary derived from the synchronization reference. Signals from transmitting UEs may arrive at the receiving UE at different timings (according to the distances between the transmitting UEs and the receiving UE). If a transmission/reception timing error (or a reception timing difference caused by propagation delays) is maintained within the CP of the receiver (RX) window of the receiving UE, the receiving UE may successfully decode the received individual signals through FFT or may orthogonally separate the signals received from the different transmitting UEs from each other.

However, when the length of the CP is shortened (or when the length of the CP is set to be short), the arrival time error of the signal(s) may not come within the CP at the receiving UE. In this case, when the RX window is configured in a conventional manner and decoding is performed through FFT, the received signals may not be decoded successfully or may not be separated from each other orthogonally. Therefore, the performance (or decoding performance) of the receiving UE is unavoidably degraded.

In this regard, considering the situation in which a TTI is shortened as discussed in NR, an SL CP length in the mmWave band is inevitably shortened as well. As such, when the length of the CP is shortened, even though the transmitting UEs transmit channels/signals in synchronization with the common synchronization reference (unlike a channel/signal having a relatively long CP length in a low frequency band), the arrival time error between received signals does not come within the CP at the receiving UE. In this case, when the receiving UE configures an RX window conventionally and performs decoding through FFT, the receiving UE inevitably experiences performance degradation. That is, the receiving UE may receive an undesired signal (inter-symbol interference (ISI)) with none of desired signals falling within the RX window configured by the receiving UE, or orthogonality may not be ensured between channels which are multiplexed in FDM, thus causing ISI.

Figure 10:
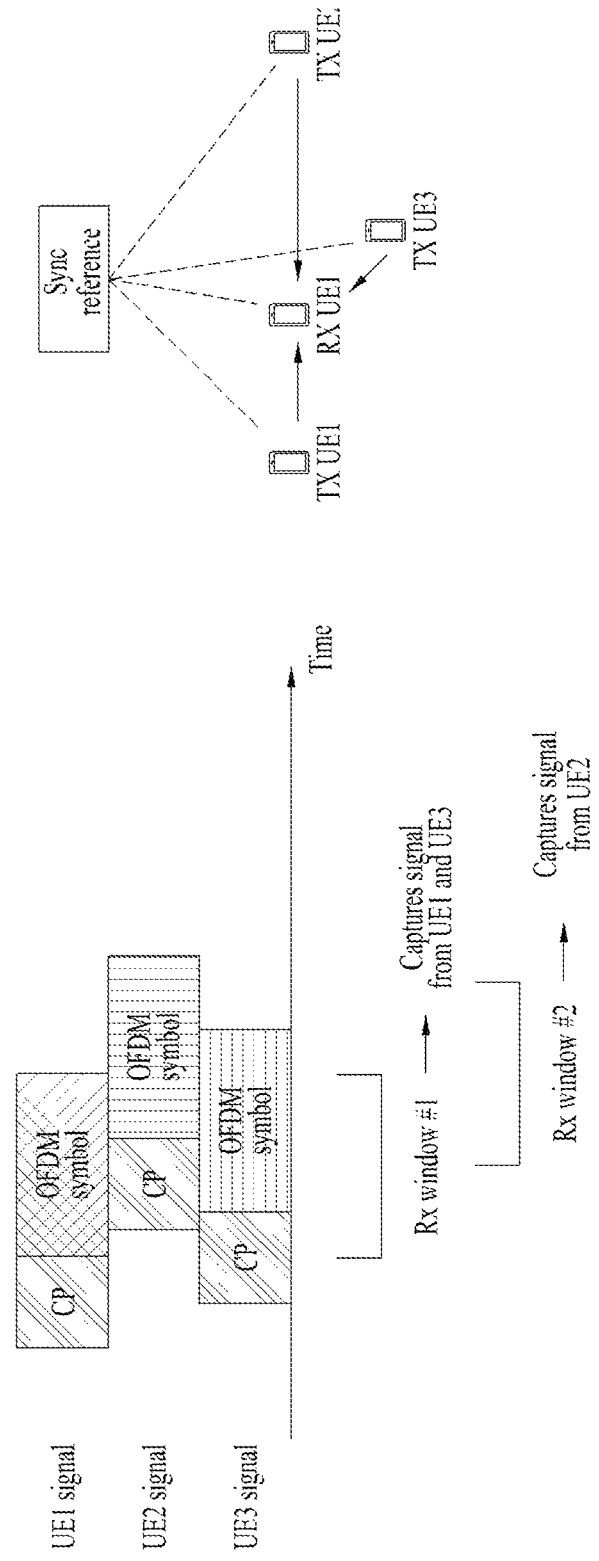
FIGS. 10 and 11 are diagrams illustrating a method of receiving signals from a plurality of transmitting UEs by a receiving UE.
Figure 11:
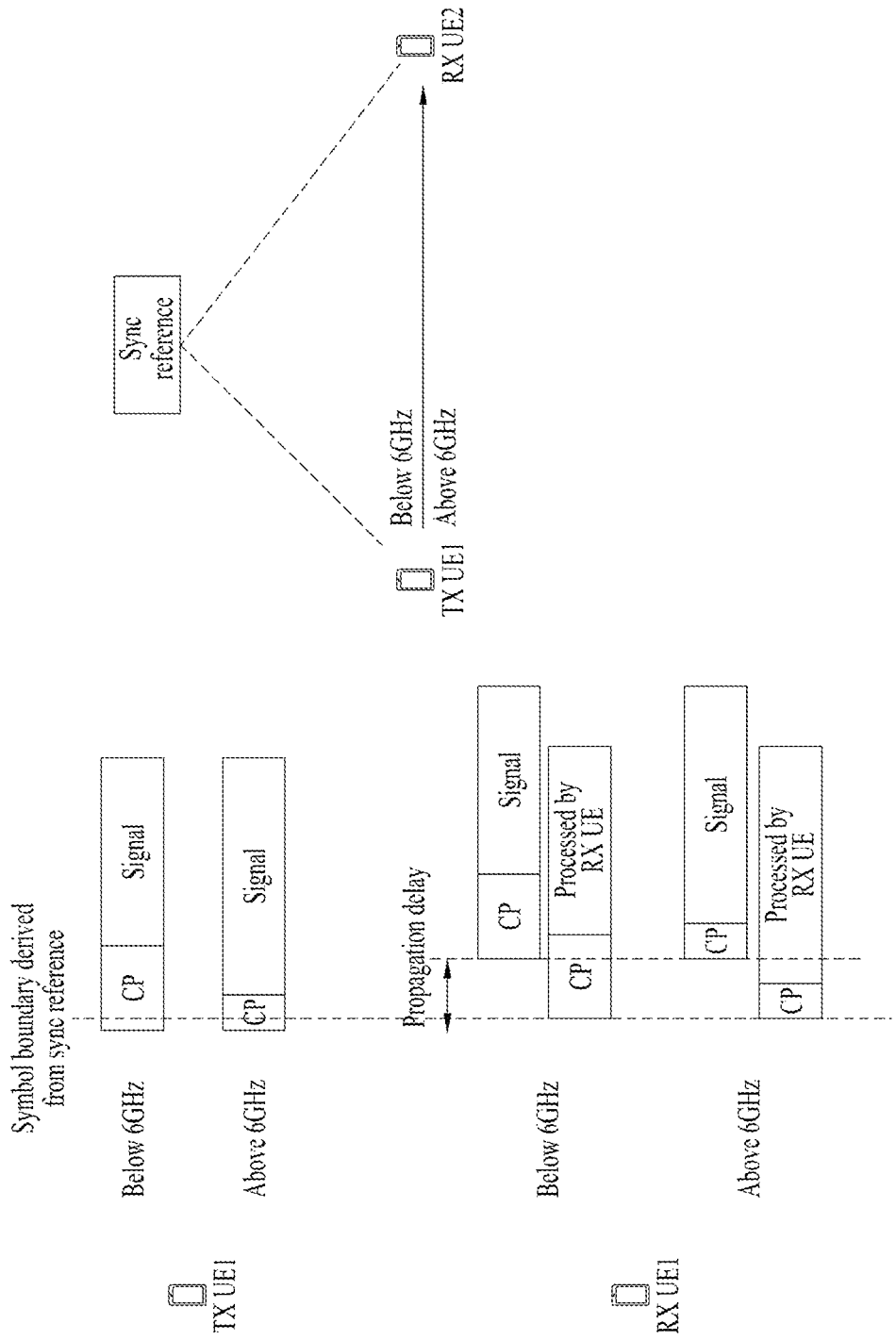

FIGS. 10 and 11 are diagrams illustrating a method of receiving signals from a plurality of transmitting UEs by a receiving UE.

Referring to FIG. 10, the distances between a receiving UE (Rx UE) and a first transmitting UE (TX UE1) and a third transmitting UE (TX UE3) are similar. In this case, since the arrival time difference between signals received by the RX UE is within a CP length, the RX UE may decode a signal received from each of TX UE1 and TX UE3 through FFT based on a single RX window (e.g., RX window #1 illustrated in FIG. 10). Alternatively, the RX UE may separate and successfully decode the two signals. However, since the distance between a second transmitting UE (TX UE2) and the RX UE is significantly different from the distances between the other TX UEs and the RX UE, the RX UE may experience reception performance gradation due to ICI/ISI, when decoding a signal received from each TX UE through FFT based on RX window #1.

On the other hand, even when one TX UE transmits "channels/signals with different CP lengths in synchronization with a common synchronization reference" as illustrated in FIG. 11, it may also occur that "the arrival time error between the received channels/signals does not come within a CP at the RX UE". More specifically, it is assumed in FIG. 11 that the TX UE transmits a channel/signal having a relatively long CP length at or below 6 GHz (or below 6 GHz) and a channel/signal having a relatively short CP length at or above 6 GHz (or above 6 GHz). In this case, a first channel (or first signal) transmitted at or below 6 GHz (or below 6 GHz) and a second channel (or second signal) transmitted at or above 6 GHz (or above 6 GHz) experience the same (or similar) propagation delay and arrive at the RX UE.

The RX UE may receive the first channel and the second channel having the same (almost similar) propagation delay. In this case, since the arrival time error of a channel/signal with a relatively long CP length (e.g., the channel/signal transmitted at or below 6 GHz in FIG. 11) is within the CP length, the RX UE may set an RX window and successfully decode the received first channel. On the contrary, since the arrival time error of a channel/signal with a relatively short CP length (e.g., the channel/signal transmitted at or above 6 GHz in FIG. 11) does not come within the CP length, when the RX UE decodes the second channel based on an RX window "determined based on the same timing synchronization as at or below 6 GHz (or below 6 GHz)", ICI/ISI may cause reception performance degradation.

In other words, a signal transmitted at or below 6 GHz (or below 6 GHz) may have a different CP length from a signal transmitted at or above 6 GHz due to their different numerologies (TTI lengths or SCSs). For example, the signal transmitted at or above 6 GHz may be configured to have a shorter CP length than the signal transmitted at or below 6 GHz (or below 6 GHz).

That is, there is a need for methods of solving the problem that an RX UE experiences the degradation of decoding performance because a short CP length-caused propagation delay between a TX UE and the RX UE is not appropriately overcome.

To solve the problem of degraded decoding performance, a method of adjusting the CP length of a channel/signal to be transmitted at or above 6 GHz (or above 6 GHz) based on the distance between a TX UE and an RX UE, which has been obtained from a channel/signal received at or below 6 GHz (or below 6 GHz) is proposed below.

Figure 12:
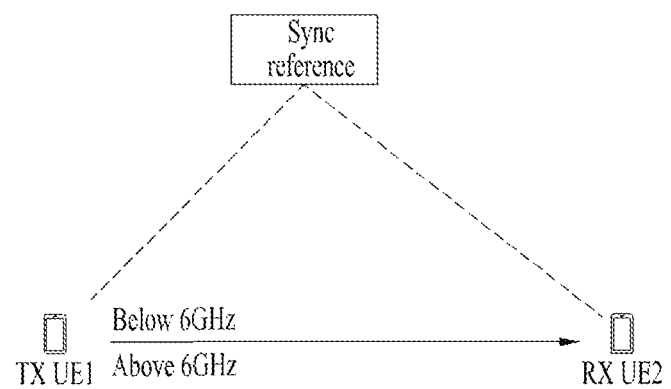
FIGS. 12 and 13 are diagrams illustrating a method of adjusting a CP length for a band at or above 6 GHz based on the distance between a transmitting UE and a receiving UE.
Figure 13:
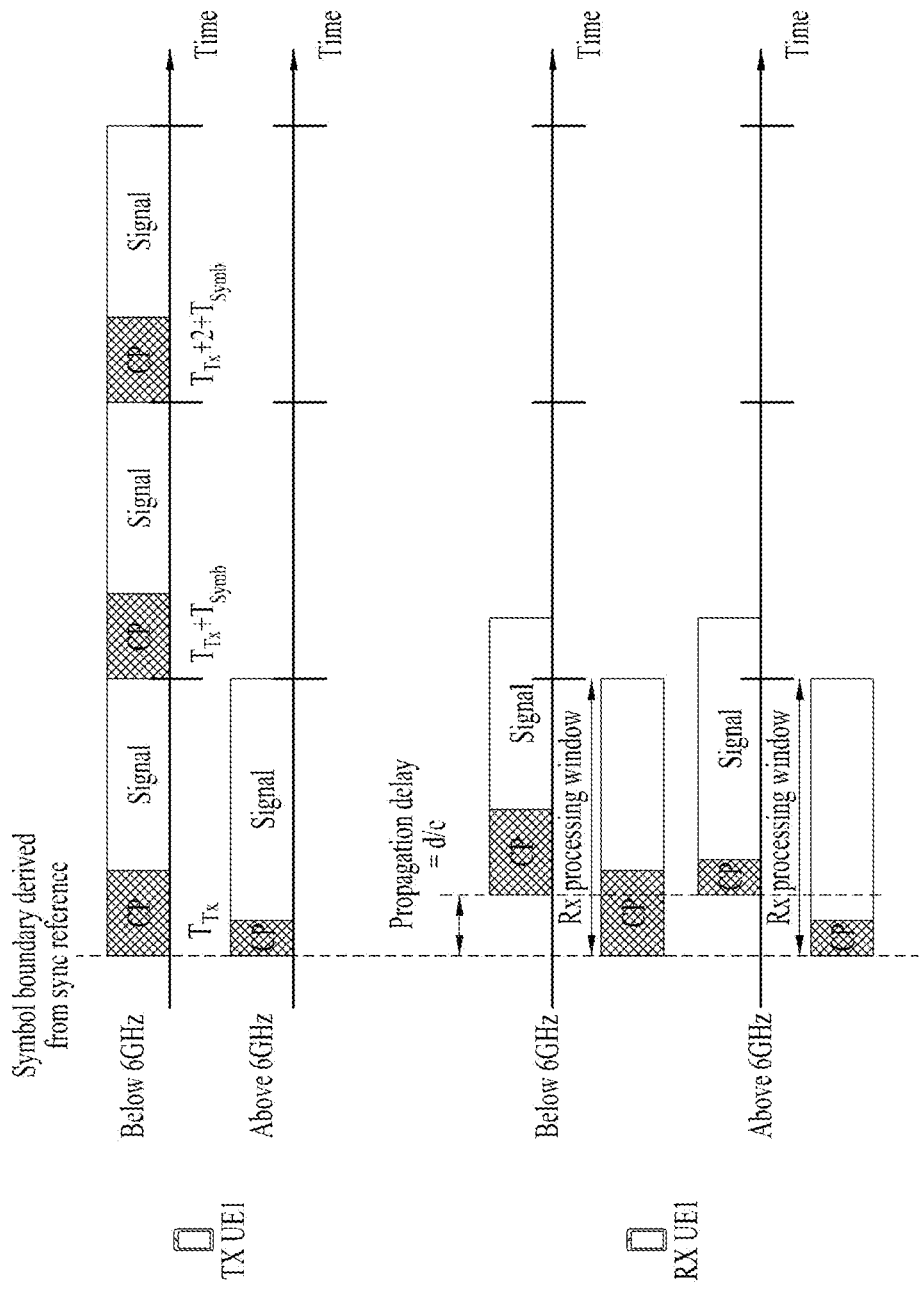

FIGS. 12 and 13 are diagrams illustrating a method of adjusting a CP length for a band at or above 6 GHz based on a distance between a TX UE and an RX UE by the RX UE.

Considering the situation in which a TTI is shortened (an SCS is increased) as discussed in NR, an SL CP length is inevitably shortened in the mmWave band. As such, when the CP length is shortened, the arrival time error of received signal(s) may not come within a CP frequently at the RX UE. In this case, when an RX window is set and decoding is performed through FFT in a conventional manner, the UE inevitably experiences performance degradation.

Specifically, referring to FIGS. 12 and 13, when one TX UE transmits signals (or channels/signals having different CP lengths in synchronization with a common synchronization reference), the arrival time error between the signals may not fall within a CP length at the RX UE.

While channels/signals having different CP lengths transmitted in synchronization with a common synchronization reference are described in the context of transmission carriers divided with respect to 6 GHz in FIGS. 12 and 13, the present disclosure is not limited thereto, and the proposed invention is applicable to all of the channels/signals having different CP lengths.

Referring to FIG. 13, a TX UE may transmit a channel/signal having a relatively long CP length at or below 6 GHz (or below 6 GHz) and a channel/signal having a relatively short CP length at or above 6 GHz (or above 6 GHz). The CP lengths of the two transmission carriers may be different, i) when the SCSs of the two transmission carriers are different, ii) one carrier is configured with a normal CP, the other carrier is configured with an extended CP, and/or iii) the cases "i) and ii)" occur in combination.

A channel/signal (first channel) transmitted at or below 6 GHz (or below 6 GHz) and a channel/signal (second channel) transmitted at or above 6 GHz (or above 6 GHz) may experience the same (or similar) propagation delay and arrive at the same RX UE. The RX UE receives the signals that have experienced the same (or similar) propagation delay in the two transmission carriers. Because the (propagation delay-caused) reception time error of the first channel being a channel/signal having a relatively long CP is within the CP, there is no problem in configuring an RX window and decoding the received signal at the RX UE.

However, since the second channel has a relatively short CP, when the second channel is decoded according to an RX window set based on the same timing synchronization as that of the band at or below 6 GHz, the arrival time error of the second channel may not be within the CP length. In this case, the RX UE may not successfully decode the second channel, thereby degrading the reception performance of the second channel.

Therefore, a separate action is required for the second channel. For example, to make the channel/signal arrival time error fall within a CP length (1) the transmission timing of the TX UE needs to be adjusted, (2) the RX UE needs to adjust an FFT window boundary timing, or (3) the TX UE needs to adjust a CP length based on a propagation delay value (so that the propagation delay falls within the CP length).

Therefore, the TX UE needs to prevent/minimize a propagation delay which does not fully fall within a CP length due to reduction of the CP length in V2X using the mmWave band by obtaining information about the distance between the TX UE and an RX UE through signaling at or below 6 GHz (or below 6 GHz) and adjusting a CP length to be applied to a signal transmission at or above 6 GHz (or above 6 Ghz) based on the obtained information (so that a propagation delay may be overcome).

Distance-Based CP Length Adjustment

To ensure coverage, a carrier/channel/signal transmitted at or below 6 GHz (or below 6 GHz) may be configured with a CP longer than a timing error in consideration of propagation delays at all RX UEs receiving the carrier/channel/signal (or target RX UEs).

That is, the CP length (CP type or SCS) of the first channel (or, the channel, carrier, or signal transmitted in the below 6 GHz band) may be set to be longer than the CP length (CP type or SCS) of the second channel (the channel, carrier, or signal transmitted in the above 6 GHz band). Alternatively, the SCS of the first channel may be set to be different from or identical to the SCS of the second channel.

Hereinafter, it is assumed that the first channel or the second channel, which has a different CP length, is transmitted to a single RX UE in synchronization with the same reference, and a carrier/channel/signal based on which a subframe boundary is determined (e.g., a carrier/channel/signal carrying an SLSS such as a PSSS) is defined as "anchor carrier/channel/signal".

A carrier (or channel/signal) in which the SLSS is transmitted/received may be interpreted as an anchor carrier (or anchor channel/anchor signal). For example, the anchor carrier may be a carrier at 5.9 GHz in which the SLSS is transmitted and received, and data or control information is transmitted and received on the second channel with a relatively short CP length according to time synchronization configured based on the anchor carrier.

The carrier/channel (or the second channel) sharing the timing synchronization based on the anchor carrier may be (1) a carrier/channel having a relatively short CP length relative to the anchor carrier or the anchor channel, (2) a carrier/channel transmitted in a high frequency band relative to the anchor carrier or the anchor channel, or (3) a data transmission channel/signal (e.g., PSSCH) and/or a control information transmission channel/signal (e.g., PSCCH).

In this case, since the CP length of the second channel is less than that of first channel, when the second channel is received in time synchronization based on the anchor carrier, the arrival time error of the second channel is highly likely to be beyond the CP length.

Therefore, the TX UE needs to minimize generation of an arrival time error beyond a CP length, which is caused by a shortened CP length in V2X communication using the mmWave band, by obtaining information about the distance between the TX UE and the RX UE through signaling at or below 6 GHz (below 6 GHz) and adjusting a CP length and/or SCS to be applied to a signal transmission at or above 6 GHz (above 6 GHz) (to overcome a propagation delay) based on the obtained distance information.

For convenience of description, the following definitions may be given.

TX UE and RX UE: A UE having information to be transmitted on channel #Y (or the second channel) is defined as a TX UE, and a UE having information to be received on channel #Y (or channel #X) is defined as a RX UE.

Anchor carrier of channel #Y: A carrier in which channel #X is transmitted.

Channel #Y (or the second channel): A channel transmitted in a higher frequency band than channel #X. For example, channel #Y is a signal transmitted at 63 GHz (above 6G), and channel #X is a signal at 5.9 GHz (below 6G).

Alternatively, channel #X and channel #Y may be different channels or signals. For example, channel #X may be a channel (e.g., PSCCH) through which control information is transmitted or a channel through which a discovery message is transmitted, whereas channel #Y may be a channel (e.g., PSSCH or second SCI) through which data is transmitted or a channel through both of control information and data (e.g., first SCI, second SCI, PSCCH, and PSSCH) are transmitted.

Alternatively, channel #X and channel #Y may be channels transmitted in resources of a carrier/resource pool/BWP configured with different numerologies. The numerologies may be SCSs and/or CP types (on the other hand, channel #X and channel #Y may be configured with at least one same numerology).

Alternatively, channel #X and channel #Y may be channels/signals transmitted in the same frequency band (or adjacent or different frequency bands).

Figure 14:
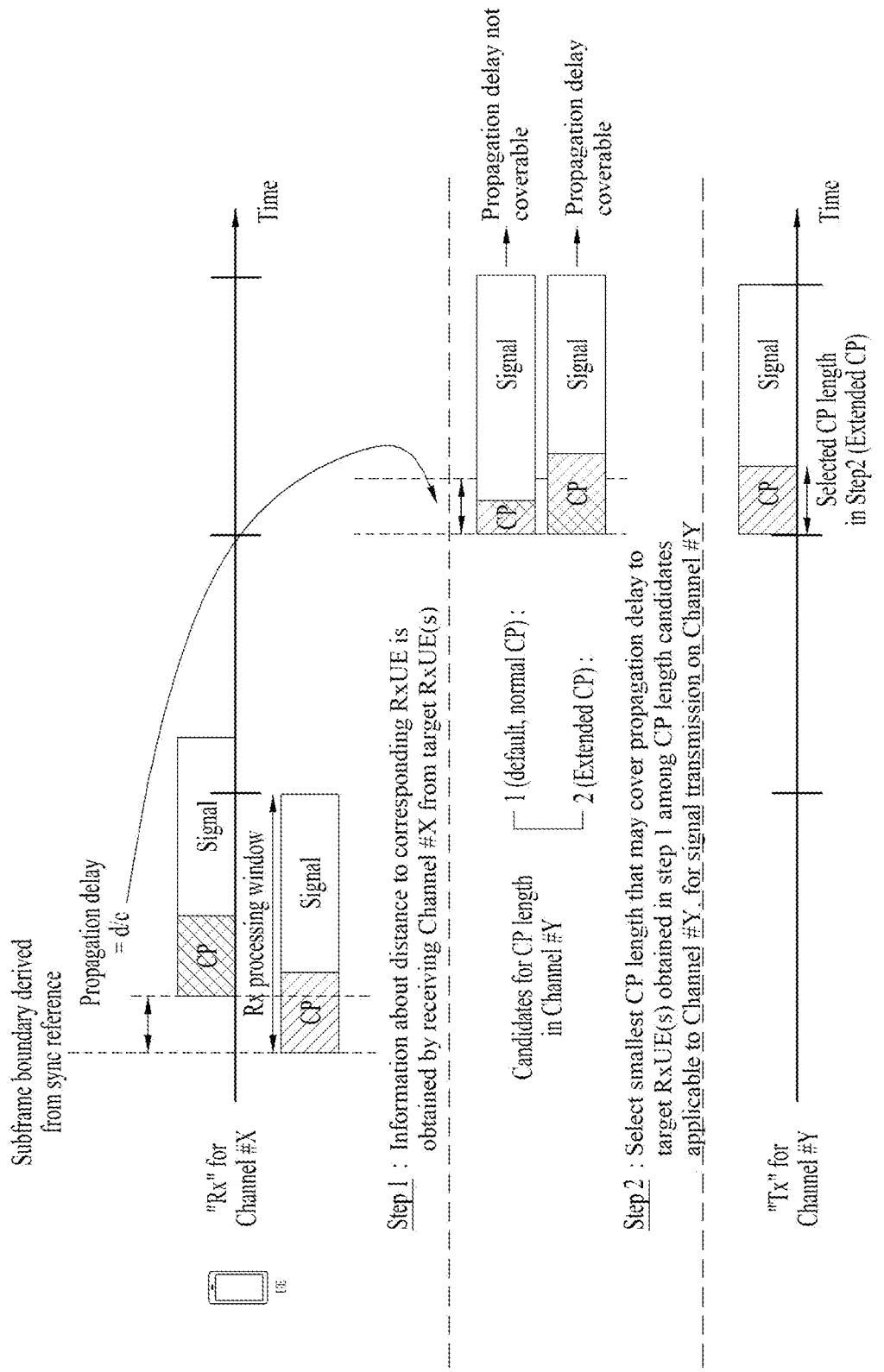
FIG. 14 is a diagram illustrating a method of adjusting a CP length by a transmitting UE.

FIG. 14 is a diagram illustrating a method of adjusting a CP length by a TX UE.

Referring to FIG. 14, the TX UE may adjust a CP length in step 1 to step 3 as follows.

In step 1, the TX UE may obtain information about the distance between the TX UE and target UE(s), that is, RX UE(s) by receiving channel #X (or the first channel). Specifically, the TX UE may calculate the distance to the RX UE from location information about the RX UE (or receiver) included in channel #X (or a CAM or BSM received at or below 6 GHz).

Alternatively, the RX UE may estimate or predict the distance to the TX UE based on the reception time of a previously received channel #X (or first channel). For example, the TX UE may transmit a preamble and/or a sequence on channel #X in advance. The preamble and/or the sequence may be transmitted in a synchronization signal related to synchronization, a control message (for scheduling data transmission), and/or a reference signal (RS). The RX UE may predict or calculate the distance to the TX UE through detection of the preamble (and/or the sequence) and/or a received signal quality (or a measurement value such as an RSRP, a pathloss, or the like). Alternatively, the RX UE may signal information about the calculated or predicted distance to the TX UE to the TX UE.

Alternatively, when the TX UE and at least one RX UE have already been determined as a TX-RX UE pair for the signal (i.e., channel #Y) in the A6 GHz band, the at least one RX UE may transmit "information about the distance to the TX UE predicted from the reception time of channel #X received in the B6 GHz band at a previous time by the RX UE" to the TX UE on channel #X.

Alternatively, when the TX UE and at least one RX UE have already been determined as a TX-RX UE pair for the signal (i.e., channel #Y) in the A6 GHz band, the at least one RX UE may calculate the distance to the TX UE predicted from the reception time of channel #X, directly select an appropriate SCS and/or CP type based on the calculated distance, and report or transmit information about the selected SCS and/or CP type to the TX UE.

In step 2, the TX UE may adjust or change at least one of the following parameters based on the information about the distance to the RX UE (and/or the information about the selected SCS and/or CP type) obtained in step 1.

CP type: Normal CP or extended CP

SCS

In NR, a single numerology may be configured for a single BWP, and BWP switching is required to change the numerology. That is, a plurality of numerologies may not be used for a single BWP. Moreover, when signals having a plurality of different CP lengths exist in a carrier, ICI may occur between the signals. Therefore, different CP types and/or SCSs may be configured for different carriers/resource pools/BWPs, and selecting an SCS/CP type in the above steps may be interpreted as selecting a carrier/resource pool/BWP in which a signal (e.g., channel #X) is to be transmitted at or above 6 GHz (above 6 Ghz).

Specifically, the TX UE determines an SCS and/or a CP type as the information obtained in step 1 (the information about the distance to the RX UE and the information about the selected SCS and/or CP type) as follows.

First, when the TX UE is capable of changing/selecting a CP length without changing an SCS (or when it is impossible to change the SCS) in unicast communication, the TX UE may select the shortest of CP length candidates that cover the propagation delay of the RX UE.

Alternatively, when the TX UE is capable of changing/selecting an SCS and a CP type (or a CP length based on the SCS and the CP type), the TX UE may select one of SCS and CS type combination candidates which may cover the propagation delay of the RX UE. Specifically, the TX UE may select a suitable SCS and CP type (or CP length based on the SCS and the CP type) from among the SCS and CP type (or CP length) combination candidates based on the movement speed of the TX UE and/or the movement speed of the RX UE.

Alternatively, in multicast communication, the TX UE may select an SCS and/or CP type having a CP length which covers the propagation delay of an RX UE farthest from the TX UE among at least RX UE (or target receiver).

Alternatively, in multicast communication, the TX UE may group a plurality of RX UEs (or target receivers) into a plurality of groups based on the distances between the TX UE and the RX UEs, and configure a different SCS and CP type (or a different CP length based on the SCS and the CP type) for each group.

For example, a TX UE for which an SCS of 60 kHz is configured and two CPs of different lengths, that is, the normal CP and the extended CP (or two CP types and SCSs) are supported may group a plurality of RX UEs (or target RX UEs) into RX UEs (a first reception group) at positions having propagation delays that may be covered by the normal CP and RX UEs (a second reception group) at positions at relatively long distances, having propagation delays which may not be covered by the normal CP. The TX UE may transmit a signal, channel, or data to each RX UE by applying the different CP lengths to the first reception group and the second reception group through use of different time/frequency resources (e.g., carriers/resource pools/BWPs) for the first reception group and the second reception group. In this case, the TX UE may transmit a signal with a relatively long CP length (e.g., the extended CP) with higher transmission power than a signal with a relatively short CP length (e.g., the normal CP).

In step 3, before transmitting channel #Y to which the changed CP length is applied at or above 6 GHz (or above 6 GHz), the TX UE may transmit information about the intended adjusted/changed CP length to the RX UEs through signaling at or below 6 GHz. Alternatively, the CP length change information and channel #Y may be transmitted together at or above 6 GHz (or above 6 GHz). However, in this case, the corresponding information should be transmitted with a default SCS and/or CP type pre-agreed between UEs (or preconfigured by a network).

Alternatively, the TX UE may not transmit information about the adjusted CP length to the RX UE. In this case, without knowledge of a CP length (e.g., the normal CP or the extended CP) configured for a received signal, the RX UE needs to attempt FFT detection a plurality of times based on each of a plurality of available CP lengths. For example, the RX UE may have to take the computational complexity of removing as much as the normal CP from the received signal and performing an FFT operation, and removing as much as the extended CP from the received signal and performing an FFT operation.

The "information about the intended adjusted CP length" transmitted from the TX UE to the RX UE may be transmitted (1) in an n-bit indicator, (2) as a direct CP length value, or (3) in information about a carrier/resource pool/BWP in which channel #Y is to be transmitted at or above 6 GHz (above 6 GHz) (e.g., when a different SCS and/or CP length is configured or mapped for each carrier/resource pool/BWP).

Specifically, the TX UE may provide or indicate the information about the intended adjusted CP length to the RX UE based on the n-bit indicator. For example, the TX UE may indicate to the RX UE that the "CP length (and/or SCS) is changed to be different from that of a current or previous received signal by the n-bit indicator. In this case, since it has only to be indicated whether the CP length is changed (on/off), the TX UE may use a 1-bit indicator.

Alternatively, the TX UE may directly indicate a configured value for a CP length or SCS mapped to a bit combination of the n-bit indicator. For example, when two CP lengths, that is, the normal CP and the extended CP are configurable, the TX UE may indicate the normal CP by setting the bit value of the n-bit indicator to 1 and the extended CP by setting the bit value of the n-bit indicator as 0. Alternatively, when there are three or more CP length candidates supportable by the TX UE, a mapping relationship between the bit values of the n-bit indicator and the CP lengths may be preconfigured between the TX UE and the RX UE or may be preconfigured for or pre-indicated to the TX UE by the network.

Alternatively, the TX UE may indicate both an SCS and a CP type to the RX UE by the n-bit indicator. That is, a plurality of SCS and CP type combinations may be pre-mapped to the bit values of the n-bit indicator. For example, the mapping relationship may be expressed as illustrated in Table 5. Specifically, referring to Table 5, the n-bit indicator is a 4-bit indicator in which 3 bits indicate one of SCSs, and 1 bit indicates a CP type (normal or extended).

TABLE 5

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Alternatively, when a different SCS/CP type is configured for each BWP in an indication method related to the afore-described '(3)', information about a carrier/resource pool/BWP in which channel #Y is to be transmitted at or above 6 GHz (or above 6 GHz) may be represented as a BWP index. In this case, whether the CP length is to be changed may be indicated by a BWP index. Alternatively, cells (or resource pools or BWPs) corresponding to intended adjusted/changed SCSs and CP types (or CP lengths based on the SCSs and the CP types) may be pre-agreed between the TX UE and the RX UE(s) or indicated by higher-layer signaling (e.g., RRC signaling) or DCI.

Alternatively, the RX UE may estimate or interpret that the CP length (CP type and/or SCS) is an intended different CP length (CP type and/or SCS) to which that of a current or previous received signal will be changed (/has been changed) or may estimate or interpret a specific CP length (CP type and/or SCS) corresponding to (or mapped to) the bit combination of the n-bit indicator, from the n-bit indicator. Alternatively, the RX UE may obtain indication information (e.g., information about a CP type and/or SCS) related to a CP length (CP type and/or SCS) change and also obtain information about a carrier/resource pool/BWP in which channel #Y will be received.

In the proposed invention, a method of controlling different transmission power according to a "CP length or CP type and/or SCS" may be considered. In this regard, a method of controlling transmission power in consideration of support of a plurality of BWPs (e.g., a plurality of configured BWPs or a plurality of active BWPs) will be additionally proposed below.

Figure 15:
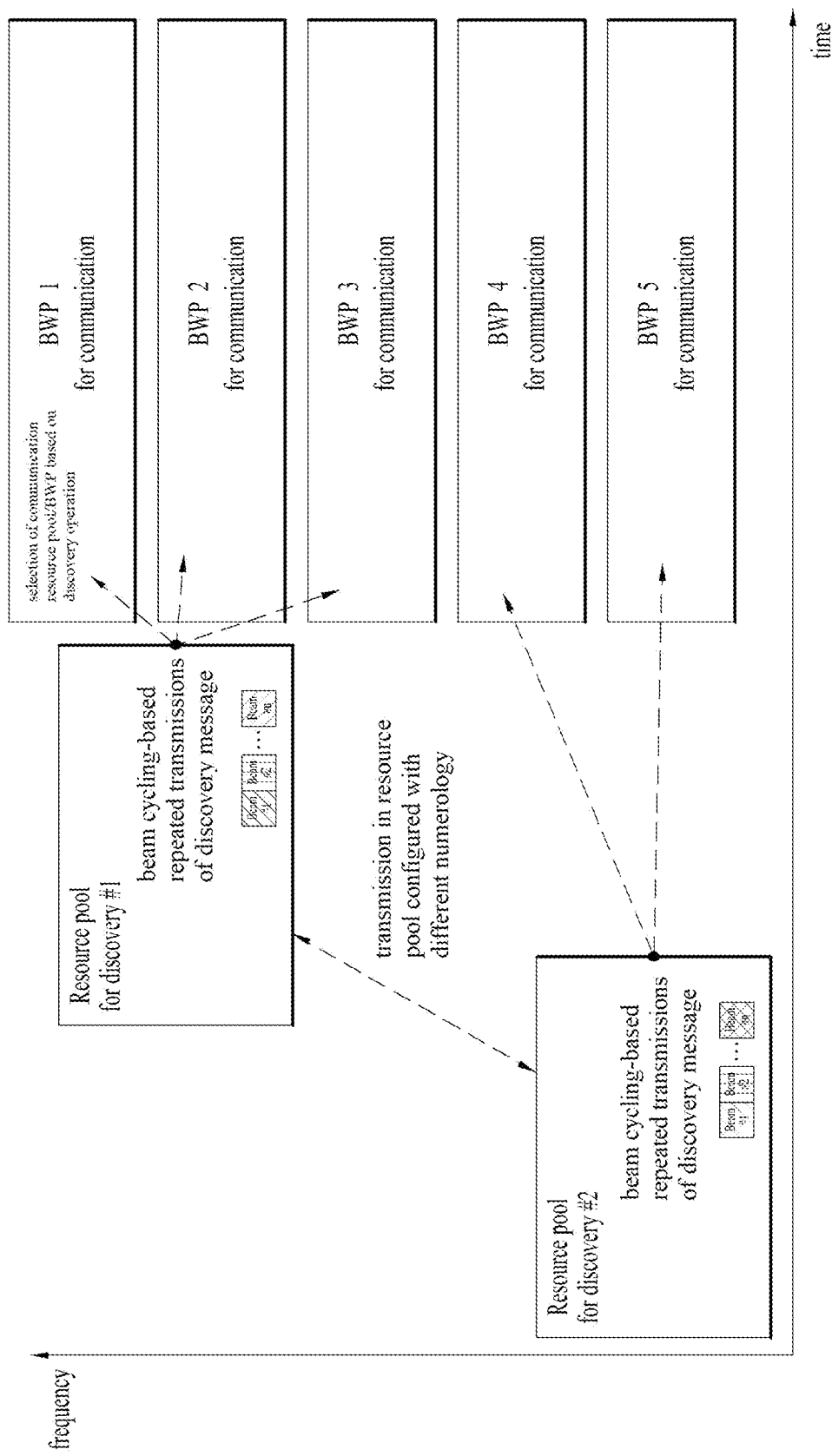
FIGS. 15 and 16 are diagrams illustrating a method of configuring or reconfiguring a BWP or resource pool for communication by a UE.
Figure 16:
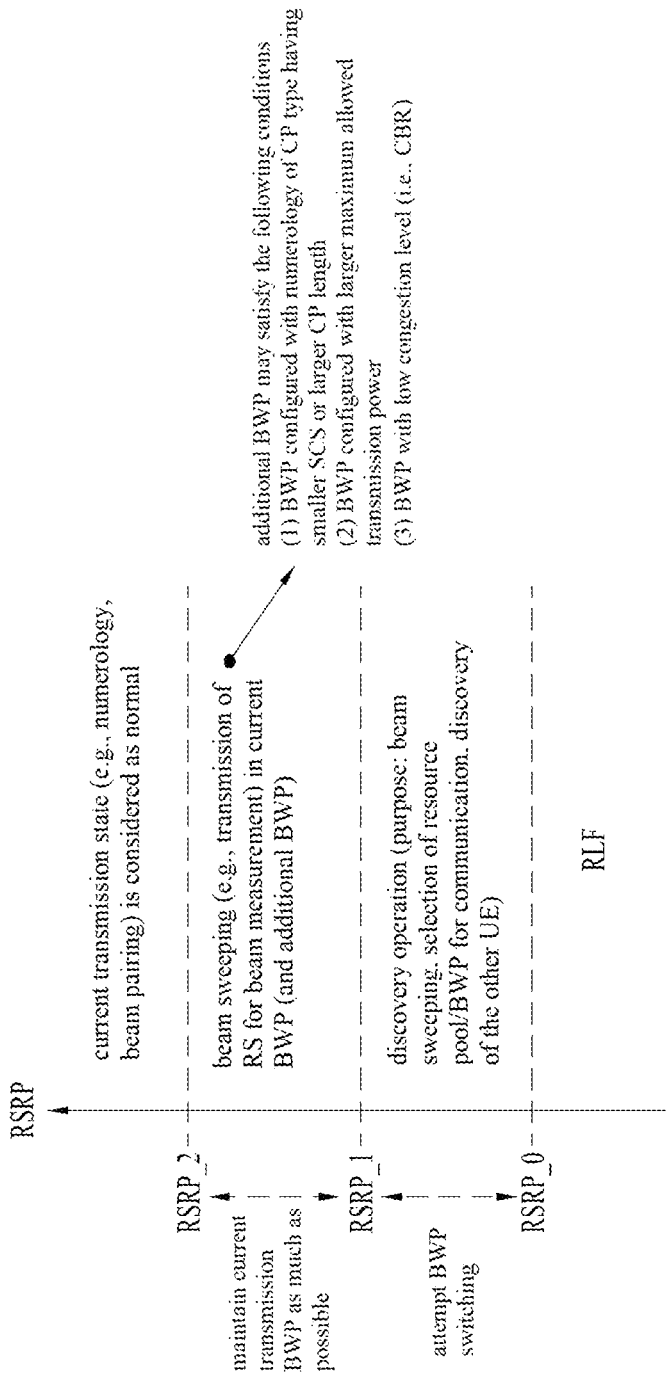

FIGS. 15 and 16 are diagrams illustrating a method of configuring or reconfiguring a BWP or resource pool for communication by a UE.

In consideration of support of a plurality of BWPs, an overall connection-based uncast and/or multicast communication procedure may be performed based on a discovery operation as illustrated in FIG. 15.

Specifically, unicast pair detection, selection of a numerology (or a resource pool/BWP configured with a numerology to be used) for use in communication, and/or beam sweeping (and/or selection) may be performed between the TX UE and the RX UE by using discovery messages in the discovery procedure or operation.

A specific UE (the TX UE or the RX UE) may establish a TX UE-RX UE connection in a resource pool and/or a BWP selected/recommended for communication based on the discovery operation, and transmit and receive packets through the connection. In other words, the TX UE may select a resource pool/BWP for communication between the TX UE and the RX UE and establish a PC5-RRC connection, based on the discovery operation.

Further, referring to FIG. 16, the specific UE (the TX UE or the RX UE) may determine whether to (re)select/change the resource pool/and or BWP and/or a TX-RX beam pair, for communication based on at least one preconfigured threshold.

Further, the transmission power of the communication may be controlled by using an RSRP measured in discovery resources (e.g., an RSRP calculated from a DMRS transmitted in the discovery resources). For example, in layer 3-RSRP (L3-RSRP) calculation, all/some samples or an average value of layer 1-RSRP (L1-RSRP) values calculated from the DMRS transmitted in the discovery resources may be used as an input value to an L3 filter. Particularly, when there are insufficient samples for L3-RSRP calculation or for a UE sensitive to management of transmission power such as a pedestrian UE (at the time of initial communication shortly after RRC connection establishment), additional use of the L1-RSRP of the discovery resources may be effective in determining the transmission power of a signal for communication.

Furthermore, it may occur that a propagation delay is beyond a CP length due to a shortened CP length in mmWave, and a transmission and reception operation may be performed in a BWP configured with a different CP type and/or SCS according to the distance between the TX UE and the RX UE and/or the target reception area (or distance or minimum communication range requirement) of a packet to be transmitted. A plurality of BWPs for the communication may be configured by the discovery operation or preconfigured by a physical layer or higher layer signal from the network regardless of the discovery operation. Now, a description will be given of a method of selecting or reselecting a BWP (or resource pool, carrier, or resource region) in which an SL signal is to be transmitted from among a plurality of BPWs for a discovery procedure or preconfigured communication.

As such, when a CP type is selected according to the distance between the TX UE and the RX UE, transmission/reception is highly likely to be performed in a short range in a resource pool/BWP configured with an SCS and/or CP type (e.g., normal CP) having a relatively short CP length, compared to a resource pool/BWP configured with an SCS and/or CP type (e.g., extended CP) having a relatively long CP length.

Accordingly, a packet transmission in the resource pool or BWP configured with the short CP type may be configured with relatively low transmission power. In contrast, because a packet is transmitted and received in a long range in the resource pool or BWP configured with the long CP type, relatively high transmission power may be configured for the resource pool or BWP.

Specifically, nominal power and/or a scaling factor may be configured to be different for a resource pool/BWP according to a CP length. For example, the nominal power and/or scaling factor may be set to a smaller value for a resource pool and/or BWP having a small CP length than for a resource pool and/or BWP having a large CP length.

The difference between CP lengths configured for at least two resource pools or BWPs may be attributed to configuration of numerologies of different SCSs and/or CP types (e.g., the normal CP type or the extended CP type).

Further, when a plurality of resource pools or BWPs are preconfigured for communication configured with different numerologies (by the network) (or when a plurality of numerologies (SCSs or CP types) are configured for the following communication based on the discovery procedure or operation (discovery message transmission and reception) (numerology-configured), the TX UE (or RX UE) may select at least one of the plurality of numerologies (or one of the plurality of resources pool or the plurality of BWPs). In this case, the TX UE (or RX UE) may preferably select a numerology having the short CP length or a resource pool (or BWP) configured with the numerology having the short CP length.

For example, when the TX UE supports both of resource pool 1 (or BWP 1) configured with a numerology having a short CP length and resource pool 2 (or BWP 2) configured with a numerology having a long CP length (when the CP lengths configured for resource pool 1 and resource pool 2 may cover a propagation delay according to the distance to the RX UE (or according to a minimum communication range requirement for a packet), the TX UE may select one of the two resource pools/BWPs to actually transmit a packet. In this case, the TX UE may preferably select the resources (resource pool 1/BWP 1) configured with the relatively short CP length, for the actual packet transmission.

In other words, when there are a plurality of BWPs configured with CP lengths covering a propagation delay according to the distance between the TX UE and the RX UE (or according to a minimum communication range requirement for a packet), the TX UE may preferably select a BWP configured with a relatively short CP length from among the plurality of BWPs, for an actual packet transmission. For example, when a TX UE which (is near to an RX UE and) will transmit a signal based on relatively low transmission power selects resource pool 2/BWP 2 in which a signal is supposed to be transmitted with relatively high transmission power, the TX UE may preferably select a resource pool configured with a short CP length because the TX UE is highly likely to receive a severe interference signal from another UE. Therefore, potential high interfering UEs may occupy resource pool 2/BWP 2 to protect a signal from a UE with low transmission power as much as possible. (Alternatively, many UEs may transmit signals with relatively high transmission power in resource pool 2/BWP 2 (relative to resource pool 1/BWP 1). Accordingly, when a UE (having a small TX UE-RX UE distance and) having low transmission power transmits a signal in resource pool 2/BWP 2, the UE may be more vulnerable to severe interference from another UE.)

However, ICI may increase in view of a CP length mismatch caused by movement speeds/directions between a TX UE and/or RX UEs, or the reception power of a desired signal may be significantly decreased with an increasing distance between a TX UE and an RX UE. For example, when the TX UE and the RX UE travel at or above a certain speed in opposite directions, their relative distance may increase. The resulting CP length mismatch may lead to a significant decrease in the magnitude of reception power.

In this regard, the TX UE may determine whether to allow use of a longer CP length or a BWP configured with a numerology (SCS/CP type) having a longer CP length in further consideration of the difference between the movement directions and/or movement speeds of the TX UE and the RX UE. That is, only when the above-described problem is predicted, a transmission may be allowed in a resource pool/BWP configured with the numerology having the longer CP according to the (absolute/relative) movement speeds and/or movement directions of the UEs (between the UEs), or selection of a numerology is allowed based on a (current CP length+margin) in consideration of the speeds/travel directions. The margin may be preconfigured or mapped according to the difference between the relative travel directions and/or (the difference between) relative speeds (or absolute speeds) of vehicles.

Alternatively, upon occurrence of a "specific case", a transmission and reception operation configured with a current numerology (or a resource pool/BWP with the current numerology) may be determined to be meaningless, and thus beam pair reselection and/or transmission resource reselection (e.g., reselection of a resource pool/BWP/actual transmission resource) may be triggered. For example, when the DMRS RSRP of a PSCCH and/or a PSSCH is equal to or less than a specific threshold, it may be determined that CP lengths are mismatched, and the above-described "specific case" has occurred.

Alternatively, in the case where a specific resource pool or BWP has already been selected, when the condition of the specific case is satisfied based on a movement speed and/or movement direction with the RX UE (a relative speed with the RX UE is equal to or greater than a specific threshold and/or the difference from the travel direction of the RX UE is beyond a specific threshold range), the TX UE may trigger beam pair reselection or transmission resource reselection (reselection of a resource pool, BWP, and time and frequency resource).

Specifically, resource pools or BWPs (or numerologies or carriers) selectable from among a plurality of resource pools or a plurality of BWPs (or a plurality of numerologies or a plurality of carriers) may be limited for the TX UE based on at least one of the following limiting conditions.

A. UE location: For example, when the location of a UE is determined/defined according to the shape of a road, this may be determined to be different from the general concept/definition of a zone (e.g., zone-based TX pool separation).

B. Predefined specific geographic area/location

C. The number of (neighboring) vehicle UEs (vehicle density) on a road

D. (Maximum/minimum) absolute/relative speed with respect to neighboring UE

E. The type of a road on which a UE is traveling (or is expected to travel) (e.g., motor road, expressway, general road (with low relative/absolute speed relative to expressway), and cross road)

F. Maximum/minimum allowed (relative or absolute) speed on a road/area in which the UE is travelling (or is expected to travel)

When the UE selects a BWP, a resource pool, or a carrier to be actually used from among a plurality of BWPs, a plurality of resources pools, or a plurality of carriers, an allowed value (a value range/maximum value/minimum value) may be preconfigured for each of the above parameters A, B, C, D, E, and F, and other related parameters, for each BWP, resource pool, or carrier and/or numerology. Alternatively, a configuration or mapping relationship for allowed (available) values of each of the above parameters A, B, C, D, E, and F for each BWP, resource pool, or carrier and/or numerology may be pre-agreed or preconfigured by the network.

For example, regarding the above limiting conditions, a first situation and a second situation may be defined. The first situation may include a case in which a UE is traveling on an expressway, a case in which a UE is traveling on a road/area with a high maximum/minimum allowed speed, a case in which a UE is highly probable to travel at a high speed in terms of the UE's location, and/or a case in which there are a large number of vehicle UEs on a road (e.g., a vehicle density is high). The second situation may include a case in which a UE is traveling on a general road, a case in which a UE is traveling on a road/area with a relatively lower maximum/minimum allowed speed, a case in which a UE is highly probable to travel at a low speed in terms of the UE's location, and/or a case in which there are a small number of vehicle UEs on a road (e.g., a vehicle density is low).

In this case, an SCS and/or CP type for the first situation may be larger or longer than an SCS and/or CP type for the second situation. Alternatively, a TX UE placed in the first situation may be limited to select a resource pool or BWP with a larger or longer SCS and/or CP type than that of an SCS and/or CP type configured for a resource pool or BWP for the second specific case. A TX UE in the second situation may use a relatively small SCS and/or a relatively short CP type, compared to the first situation. Therefore, the switching overhead of a BWP or a resource pool may be reduced significantly. In other words, as the TX UE in the second situation uses a small SCS and/or a short CP type relative to the first situation, the TX UE may prevent a CP length mismatch caused by different relative speeds and different movement directions (or a propagation delay not covered by a CP length) or the quality (RSRP or SNR) of a received signal below a specific threshold from leading to BWP switching or resource pool switching.

Alternatively, the UE may select a resource pool (or BWP, carrier, or numerology) corresponding to its traveling environment (or satisfying a condition) based on for its traveling environment (e.g., a road type and a maximum/minimum allowed traveling speed) and a parameter value range configured for a resource pool (or BWP, carrier, or numerology) (by comparison).

The above operations may be different from zone-based transmission pool separation to mitigate in-band emission (IBE). Specifically, in a zone-based transmission pool separation-related operation, a plurality of transmission pools configured with the same numerology are configured in an SL-related BWP, and a transmission pool corresponding to the zone of a TX UE is selected from among the plurality of transmission pools. In this case, it is difficult to mitigate ICI caused by the location or speed of the UE because the same numerology is used. Moreover, even though a zone-based BWP, numerology, and/or carrier selection operation is performed by extending/applying the zone-based transmission pool separation in a similar manner, the above operations may be different from the zone-based transmission pool separation-related operation in that a location/area configured with or using a specific numerology, BWP, and/or carrier is distinguished in an irregular manner (e.g., in terms of area, size, and boundary). For example, in the zone-based transmission pool separation, areas are defined in a regular manner based on a preconfigured reference point and distances.

Figure 17:
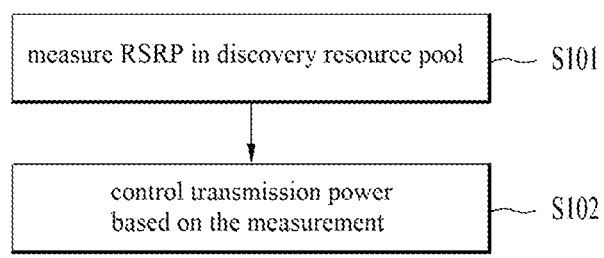
FIG. 17 is a flowchart illustrating a method of controlling transmission power based on an RSRP measured in discovery resources.

FIG. 17 is a flowchart illustrating a method of controlling transmission power based on an RSRP measured in a discovery resource.

Referring to FIG. 17, a UE may measure an RSRP in a discovery resource (measure an RSRP from a DMRS transmitted in the discovery resource) (S101). The UE may control transmission power for communication based on the measurement (S102).

The UE may perform a transmission and reception operation in a plurality of BWPs (or resource pools or carriers) having different numerologies (e.g., CP types and/or SCSs). According to this method, the UE may be configured to select resources configured with a short CP length as a resource pool/BWP to be used for an actual packet transmission. However, potential high interfering UEs may be configured to select resources configured with a relatively long CP length.

Figure 18:
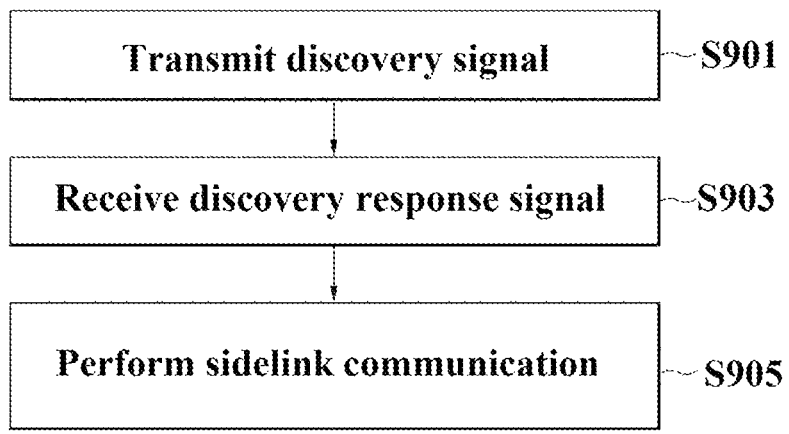
FIG. 18 is a flowchart illustrating a method of determining a transmission parameter and a resource region for a sidelink signal by a transmitting UE.

FIG. 18 is a flowchart illustrating a method of determining a transmission parameter and a resource region for an SL signal by a first UE.

Referring to FIG. 18, the first UE may transmit a discovery signal in one of at least one discovery resource region (or at least one discovery pool or discovery BWP) (S901). Each of the at least one discovery resource region is preliminarily linked to at least one resource region (resource pool or BWP) for communication or an SL signal transmission.

The first UE may receive a discovery response signal from the other UE (or a second UE) in response to the discovery signal (S903). The first UE may measure RSRPs in the discovery area based on the discovery response signal.

The first UE may determine transmission power related to SL communication with the second UE based on the RSRP measurements. The first UE may use all or some of the RSRP values measured in the discovery resource region as input values to an L3-RSRP filter related to power control of the SL communication. Alternatively, the first UE may use the average value of the RSRP values measured in the discovery resource region as the input values to the L3-RSRP filter.

Alternatively, the first UE may select a first resource region from among a plurality of resource regions linked to the discovery resource region based on at least one of the distance to the second UE or a minimum communication range requirement. Specifically, the first UE may select a first resource region configured with a numerology (CP type and/or SCS) having a CP length enough to cover a propagation delay from among the plurality of resource regions based on at least one of the distance to the second UE or the minimum communication range requirement.

In this case, the first UE may determine at least one of a nominal power or a scaling factor based on which the transmission power of the SL communication is determined, based on at least one of a CP type or an SCS configured for the first resource region. The nominal power and the scaling factor may be preconfigured to have different values according to a CP type and an SCS, or a CP length (corresponding to the CP type and the SCS). For example, as the CP type and the SCS, or the CP length (corresponding to the CP type and the SCS) increases, the nominal power and the scaling factor may be preconfigured to have larger values.

Alternatively, the first UE may provide information about the CP type and the SCS configured for the first resource region to the second UE, based on an n-bit indicator or information about the first resource region.

Subsequently, the first UE may perform SL communication (or SL communication in the first resource region) with the second UE based on the determined transmission power (S903).

Alternatively, the first UE may be configured with a plurality of resource regions for SL communication and select a resource region configured with a CP type and an SCS which satisfy at least one of the distance to the second UE and a minimum communication range requirement for a packet from among the plurality of resource regions. The plurality of resource regions may be preconfigured by a BS or the like, without being configured in a discovery procedure.

Alternatively, when there are a plurality of resource regions (hereinafter, at least two resource regions) configured with a CP type and an SCS which satisfy at least one of the distance to the second UE or the minimum communication range requirement for a packet, the first UE may select one of the at least two resource regions based on a CP length (or CP type and SCS).

Specifically, the first UE may select a first resource region configured with a CP type and an SCS corresponding to a short CP length from among the at least two resource regions. Alternatively, the first UE should basically select a resource region configured with a CP type and an SCS corresponding to a shortest CP length from among the at least two resource regions, and may be restricted from selecting another resource region configured with a CP type and SCS having a CP length greater than the CP length related to the first resource region.

However, when CP length mismatch and/or reduction of the reception power of an SL signal at the second UE is highly likely to occur in view of the difference between the movement directions of the first UE and the second UE and/or the difference between the movement speeds of the first UE and the second UE and/or a road environment (or mobility information about the first UE, mobility information about the second UE, and a road state), the first UE may be exceptionally allowed to select another resource region (or a second resource region) configured with a CP type and SCS having a longer CP length than a CP length related to the first resource region and thus perform SL communication in the second resource region.

Alternatively, when the first UE detects or determines a situation that allows selection of the second resource region during transmission of an SL signal in the first resource region, the first UE may trigger switching from the first resource region to the second resource region or changing of a resource region.

Alternatively, when the first UE performs SL communication in the selected resource region, the first UE may determine a scaling factor and/or nominal power corresponding to the CP length of the CP type and/or SCS configured for the selected resource region, and determine transmission power related to the SL communication based on the scaling factor and/or the nominal power. The scaling factor and/or the nominal power may be preconfigured to be proportional to the CP length or to be different for each CP length.

Alternatively, a configuration or mapping relationship for allowed (available) values of each of the above parameters A, B, C, D, E, and F for each BWP, resource pool, or carrier and/or numerology may be pre-agreed or preconfigured by the network, as described before.

The resource region may correspond to a BWP, a resource pool, a carrier, and/or a channel for SL communication. When the first UE and the second UE are capable of performing SL communication in at least one resource region, a plurality of resource regions may be selected for the SL communication.

While the proposed methods have been described in the context of unicast communication in a one to one TX UE-RX UE correspondence, the present disclosure is not limited to the proposed methods. The proposed methods may also be applied in a similar manner, when there are two or more RX UEs. Because examples of the above-described proposed methods may also be included as one of the implementation methods of the present disclosure, it is obvious that the examples may be considered as proposed methods. The present disclosure may also be used for UL or DL, not limited to direct communication between UEs, and thus a BS or a relay node may use the proposed methods.

Further, it may be regulated that information indicating whether the proposed methods are applied (or information about the rules of the proposed methods) is transmitted by predefined signaling (e.g., physical-layer signaling or higher-layer signaling) from a BS to a UE or from a TX UE to an RX UE.

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
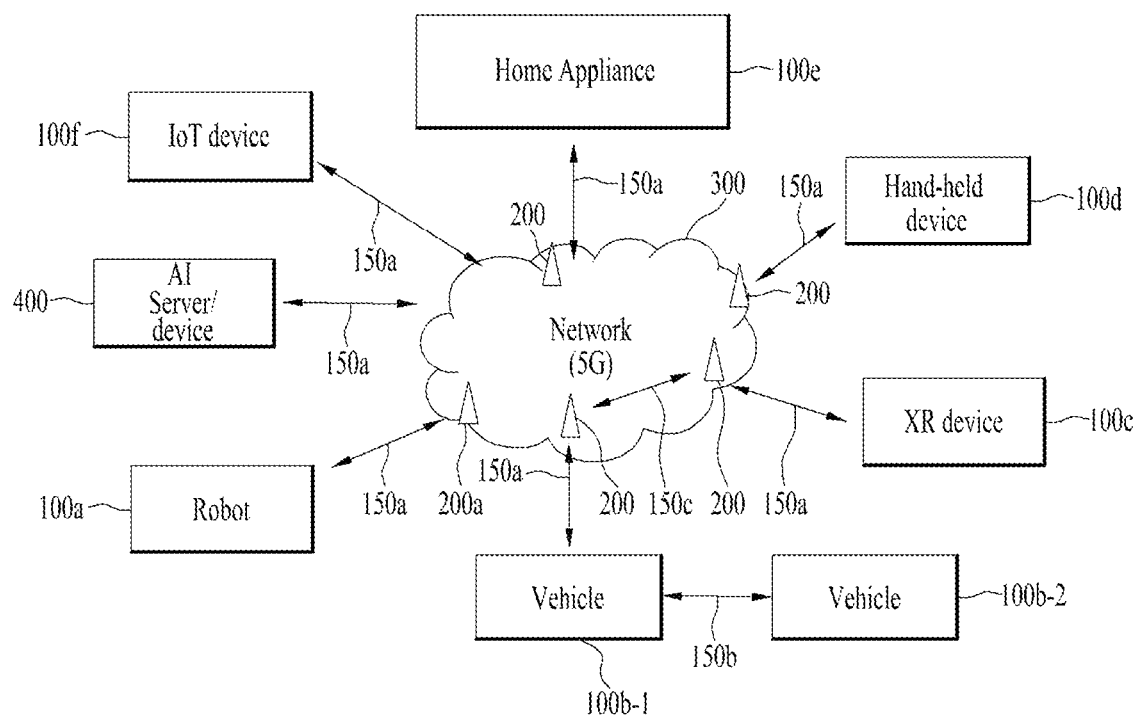
FIG. 19 illustrates a communication system applied to the present invention.

FIG. 19 illustrates a communication system applied to the present invention.

Referring to FIG. 19, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 20:
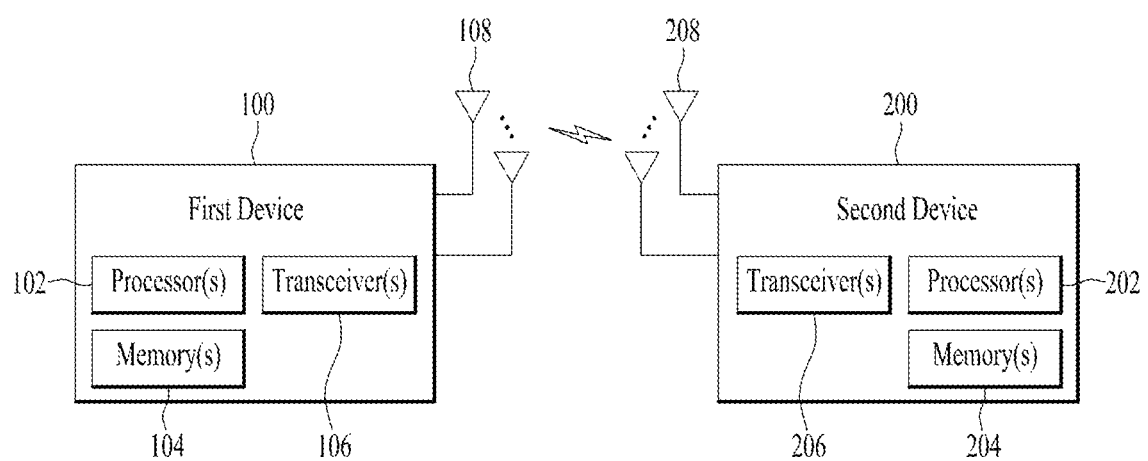
FIG. 20 illustrates wireless devices applicable to the present invention.

FIG. 20 illustrates a wireless device applicable to the present invention.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, the UE may include the processor 102 and the memory 104 coupled to the RF transceiver. The memory 104 may include at least one program for performing an operation related to the embodiments described with reference to FIGS. 10 to 18.

The processor 102 may transmit a discovery signal in a discovery resource region, receive a discovery response signal, and conduct SL communication with a second UE by controlling the RF transceiver. Transmission power related to the SL communication may be determined based on an RSRP value measured in the discovery resource region. The processor 102 may perform the operations of determining a resource region in which an SL signal is to be transmitted and a transmission parameter (e.g., a CP type, an SCS, transmission power, or the like) for the SL signal, described with reference to FIGS. 10 to 18 based on the program included in the memory 104.

Alternatively, a chipset including the processor 103 and the memory 104 may be configured. In this case, the chipset may include at least one processor, and at least one memory operably coupled to the at least one processor and when executed, causing the at least one processor to perform operations. The operations may include receiving a discovery signal in a discovery resource region, transmitting a discovery response signal, and performing SL communication with a first UE. Transmission power related to the SL communication may be determined based on an RSRP value measured in the discovery resource region. Further, the operations of determining a resource region in which an SL signal is to be transmitted and a transmission parameter (e.g., a CP type, an SCS, transmission power, or the like) for the SL signal, described with reference to FIGS. 10 to 18 may be performed based on the program included in the memory 104.

Alternatively, a computer-readable storage medium including at least one computer program causing the at least one processor to perform operations is provided. The operations may include receiving a discovery signal in a discovery resource region, transmitting a discovery response signal, and performing SL communication with a first UE. Transmission power related to the SL communication may be determined based on an RSRP value measured in the discovery resource region. Further, the operations of determining a resource region in which an SL signal is to be transmitted and a transmission parameter (e.g., a CP type, an SCS, transmission power, or the like) for the SL signal, described with reference to FIGS. 10 to 18 may be performed based on the program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 21:
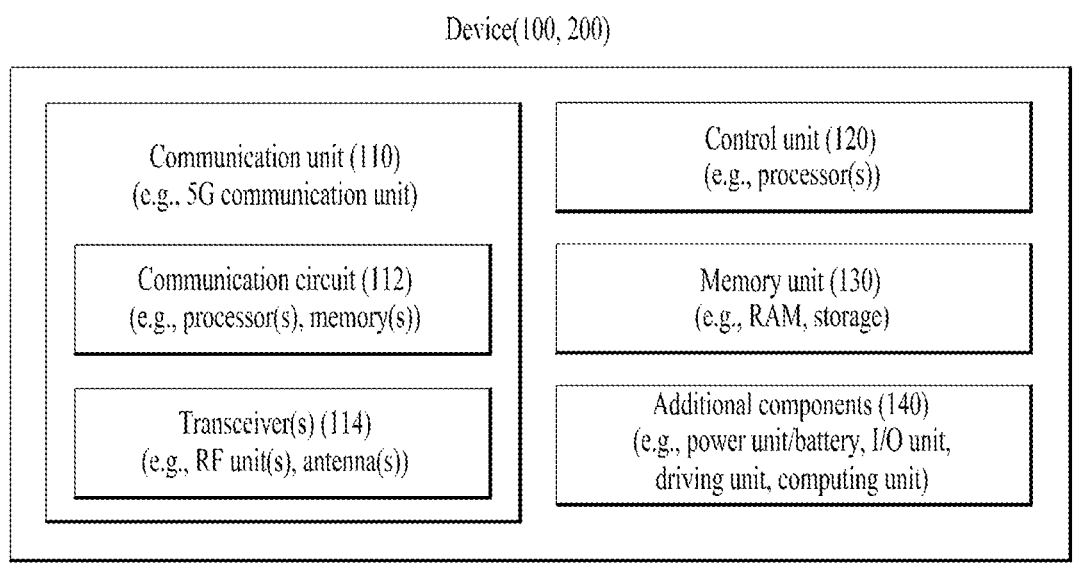
FIG. 21 illustrates another example of a wireless device to which the present invention is applied. The wireless device may be implemented in various forms according to use-examples/services.

FIG. 21 illustrates another example of a wireless device applied to the present invention. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
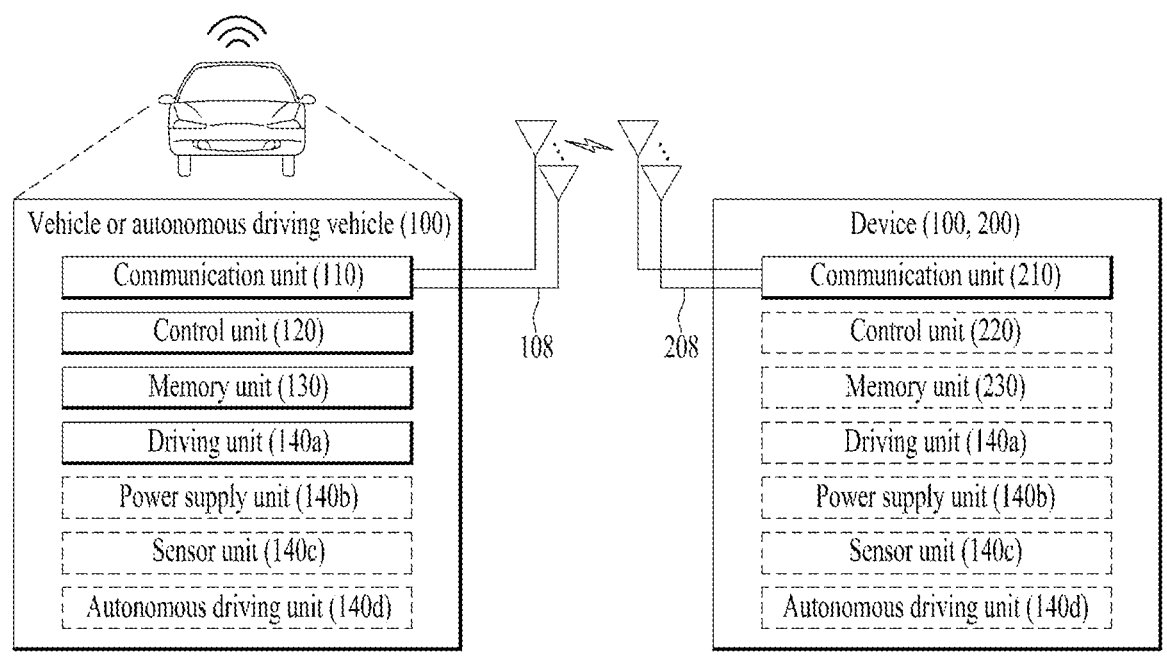
FIG. 22 illustrates a vehicle or an autonomous driving vehicle applied to the present invention.

Examples of Vehicles or Autonomous Vehicles to which the Present Invention is Applied FIG. 22 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method performed by a first user equipment (UE) for transmitting a first signal for a direct communication between UEs in a wireless communication system, the method comprising:
   transmitting a discovery signal in a discovery resource region;
   receiving, from a second UE, a discovery response signal for the discovery signal; and
   selecting one resource region from among a plurality of resource regions associated with the discovery resource region; and
   transmitting, to the second UE in the one resource region, the first signal,
   wherein a nominal power and a scaling factor related to a transmission power of the first signal are determined based on a cyclic prefix (CP) type and a subcarrier spacing (SCS) configured for the one resource region.

2. The method according to claim 1, wherein at least one of reference signal received power (RSRP) values measured in the discovery resource region is used as an input value to a layer 3-RSRP (L3-RSRP) filter related to power control of the first signal.

3. The method according to claim 2, wherein the first UE uses an average value of the RSRP values measured in the discovery resource region as an input value to an L3-RSRP filter.

4. The method according to claim 1, wherein the one resource region is selected from among a plurality of resource regions based on at least one of a distance to the second UE or a minimum communication range requirement.

5. The method according to claim 4, wherein the nominal power and the scaling factor are determined to be different depending on a CP length determined based on the SCS and the CP type.

6. A first user equipment (UE) configured to transmit a first signal for a direct communication between UEs in a wireless communication system, the first UE comprising:
   a radio frequency (RF) transceiver; and
   a processor coupled to the RF transceiver,
   wherein the processor is configured to execute instructions to perform operations comprising:
      transmitting a discovery signal in a discovery resource region,
      receiving, from a second UE, a discovery response signal for the discovery signal,
      selecting one resource region from among a plurality of resource regions associated with the discovery resource region, and
      transmitting, to the second UE in the one resource region, the first signal, and
   wherein a nominal power and a scaling factor related to a transmission power of the first signal are determined based on a cyclic prefix (CP) type and a subcarrier spacing (SCS) configured for the one resource region.

* * * * *